(12) United States Patent
Seely et al.

(10) Patent No.: US 9,487,020 B2
(45) Date of Patent: *Nov. 8, 2016

(54) ADJUSTABLE HEIGHT KEYSET FOR STENOGRAPHIC MACHINE

(71) Applicants: Greg Seely, Sewall's Point, FL (US); Kent Lu, Taipei (TW)

(72) Inventors: Greg Seely, Sewall's Point, FL (US); Kent Lu, Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 14/919,936

(22) Filed: Oct. 22, 2015

(65) Prior Publication Data

US 2016/0039218 A1   Feb. 11, 2016

Related U.S. Application Data

(63) Continuation of application No. 14/211,335, filed on Mar. 14, 2014, now Pat. No. 9,199,482.

(60) Provisional application No. 61/794,783, filed on Mar. 15, 2013.

(51) Int. Cl.
*B41J 3/26* (2006.01)
*G06F 3/02* (2006.01)
*H01H 13/14* (2006.01)
*H01H 13/84* (2006.01)

(52) U.S. Cl.
CPC .............. *B41J 3/26* (2013.01); *G06F 3/0216* (2013.01); *G06F 3/0219* (2013.01); *H01H 13/14* (2013.01); *H01H 13/84* (2013.01); *H01H 2217/042* (2013.01); *H01H 2221/032* (2013.01); *H01H 2221/066* (2013.01); *H01H 2233/07* (2013.01)

(58) Field of Classification Search
CPC ............... H01H 2217/042; H01H 2233/07; H01H 2003/127; H01H 13/84; H01H 13/14; H01H 2221/032; H01H 2221/066; B41J 3/26; B41J 5/10; B41J 5/12; B41J 5/14; B41J 5/16; G06F 3/0219; G06F 3/0216
See application file for complete search history.

(56) References Cited

U.S. PATENT DOCUMENTS

| 1,828,939 | A | 10/1931 | Ostrey |
| 4,265,557 | A | 5/1981 | Runge |
| 4,597,681 | A | 7/1986 | Hodges |
| 5,391,006 | A | 2/1995 | Danziger |
| 2011/0025606 | A1* | 2/2011 | Chvojcsek ............... B41J 3/26 345/168 |

FOREIGN PATENT DOCUMENTS

| JP | 2000173390 A | 6/2000 |
| JP | 2004119136 A | 4/2004 |

* cited by examiner

*Primary Examiner* — Daniel J Colilla

(57) ABSTRACT

A stenographic machine including a housing, a stenographic processing unit in the housing, and a stenographic keyboard at the housing and operatively connected to the stenographic processing unit to record stenographic dictation by a user. The stenographic keyboard has a plurality of adjustable key assemblies pivotally connected thereto. Each key assembly has a key cap having a first removable securing portion and a stenographic keyboard key lever having a second removable securing portion cooperating with the first removable securing portion to removably hold the key cap thereat over a variety of different positions, a lever connection end having a pivoting connection attached to the stenographic keyboard to move between a steady-state raised position and a depressed lowered position, and an extension portion extending away from the second removable securing portion and to the lever connection end.

20 Claims, 27 Drawing Sheets

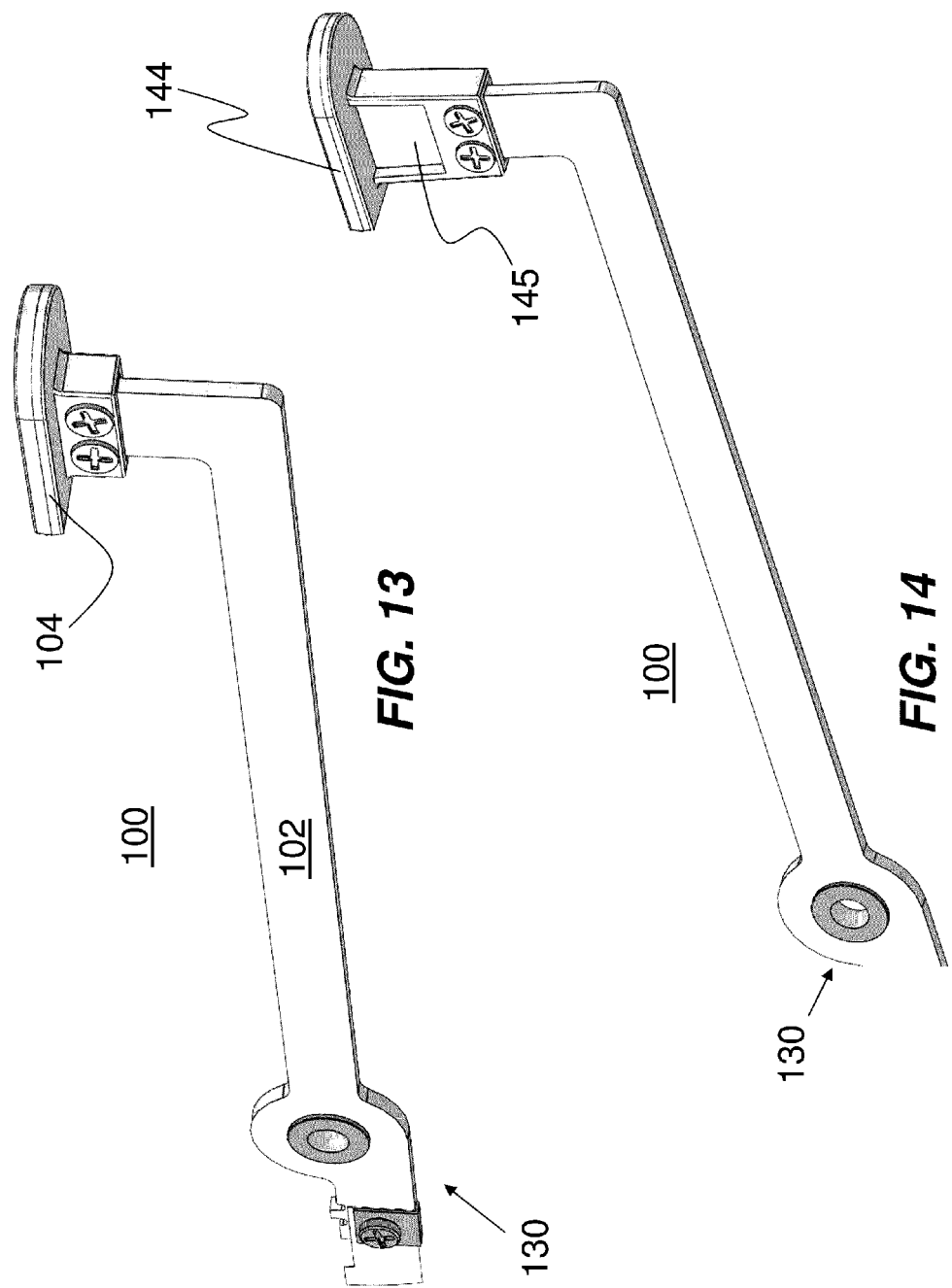

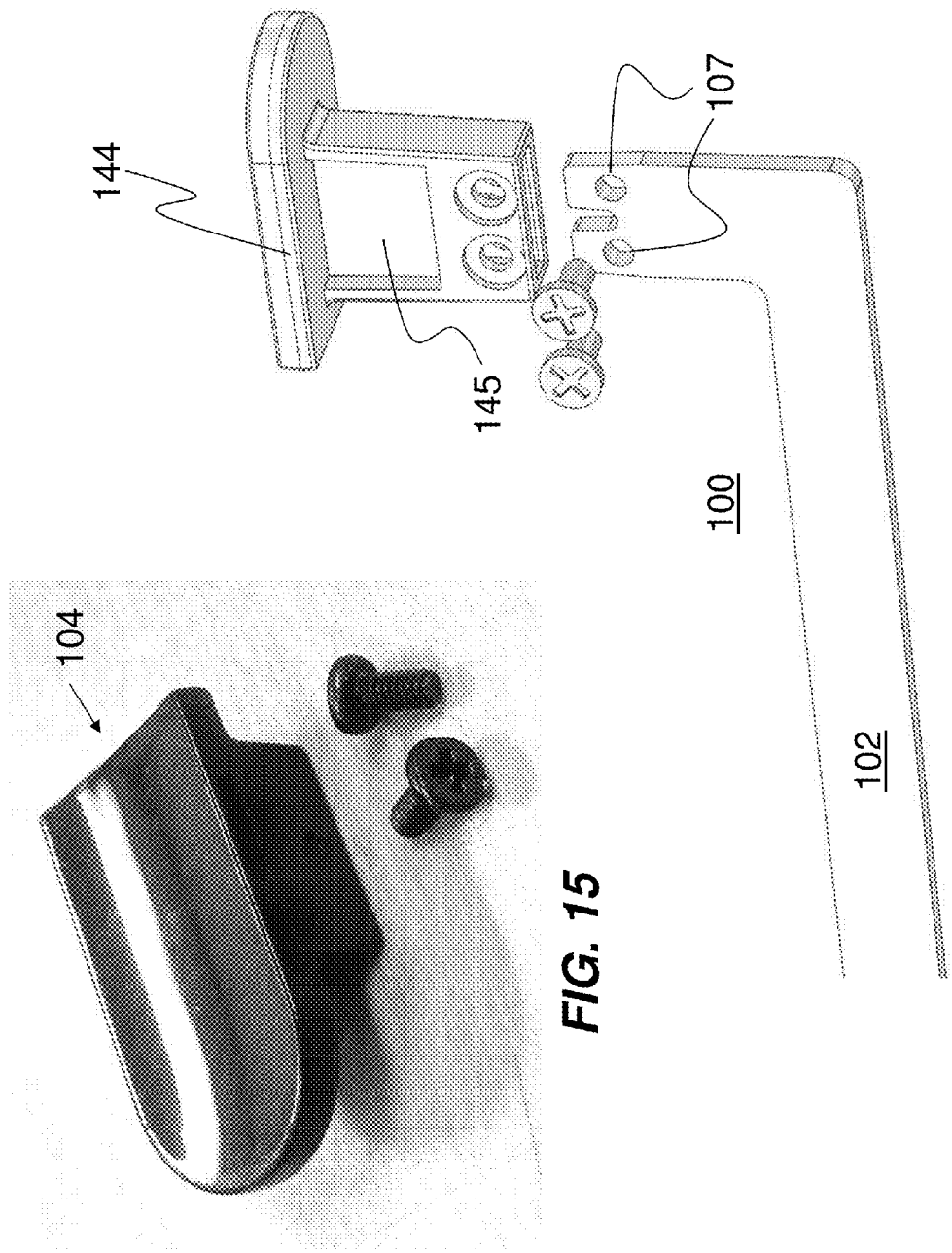

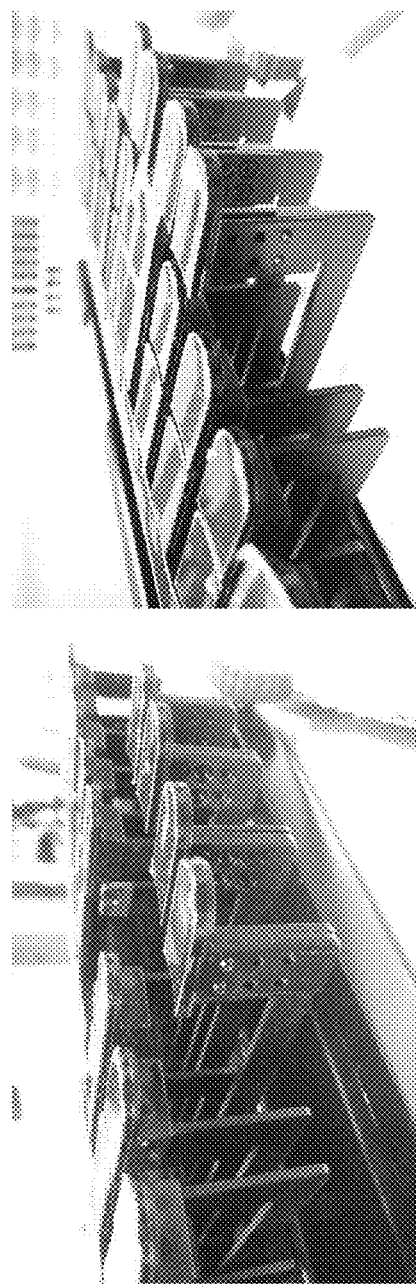
FIG. 30
FIG. 32
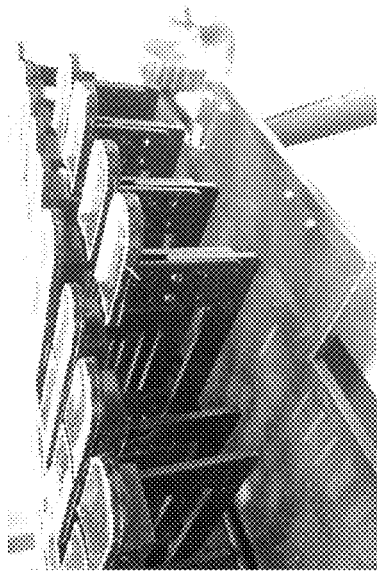
FIG. 31

ADJUSTABLE HEIGHT KEYSET FOR STENOGRAPHIC MACHINE

CROSS-REFERENCE TO RELATED APPLICATIONS

This application is a continuation of copending U.S. patent application Ser. No. 14/211,335, filed on Mar. 14, 2014 (which application claims priority to U.S. Provisional Application Ser. No. 61/794,783, filed on Mar. 15, 2013); the entire disclosures of which are hereby incorporated herein by reference in their entireties.

STATEMENT REGARDING FEDERALLY SPONSORED RESEARCH OR DEVELOPMENT

Not Applicable

FIELD OF THE INVENTION

The invention lies in the field of keystroke devices. In particular, the invention is in the field of computer or stenographic keyboards and methods and devices for adjusting a height of one or more keys of such keyboards.

BACKGROUND OF THE INVENTION

Various keystroke devices exist in the art. The most prevalent keystroke device is a computer keyboard. The keys of a standard computer keyboard are merely switches electronically indicating only a depressed state. Therefore, no signal is output or indicated by the keyboard when a keyboard is at rest, and a signal corresponding to depressed key(s) is output or indicated only when at least one key is depressed sufficiently far to "set off" the switch of that key or the switches of that set of keys.

A typewriter also has a keyboard, which can be mechanical and/or electronic. Like the computer keyboard, actuation (e.g., depression) of a key is intended to print a character. In electronic typewriters, when a key is actuated sufficiently far, a signal is sent to a processor to have the corresponding key(s) printed on the typing medium (e.g., paper). Mechanical typewriters are similar to electronic typewriters, but with one significant difference. Mechanical typewriters connect the key of the keyboard directly to the hammer containing the corresponding character to be printed on the page. Such a connection typically places the key at the end of a lever connected to a fulcrum and, when the lever is depressed at a proximal end, the distal end of the lever forcibly contacts or causes a hammer to pivot its distal end towards the page. A printing ribbon is disposed between the page and the end of travel of the hammer and a character formed at the end of the hammer is printed on the paper because the raised character presses the printing ribbon against the page.

Another keystroke device can be found on stenographic devices. The most modern stenographic devices are entirely electronic and virtually immediately translate the stenographic key actuations into an accurate written representation of the spoken word. These modern devices are analogous to the electronic typewriters and computer keyboards in that a specific actuation of a key or set of keys will cause a printing or storage of the corresponding character or set of characters.

Prior art stenographic keyboards all have a rear and middle row of ten keys each and a front row of four keys, the latter being closer to the stenographer than the former. In such machines, the keys of the front row correspond to vowels. These keys are, in the prior art, at a level lower (closer to ground) than the two rear rows. Some prior art machines are illustrated in FIGS. 1 to 6. FIGS. 1 and 2 are views of a stenographic writer manufactured by the Stenograph Corporation and called a Mira. As is clear from FIG. 1, the vowel keys in the front row are in a different, lower, plane than the keys in the two rear rows. The Mira has the ability to adjust key sensitivity but this adjustment is entirely mechanical, it is also inconvenient. FIG. 3 shows the top of the machine opened, revealing individual key sensitivity adjustment wheels for each of the keys. Thus, in order to make any key adjustment, the top of the machine must be opened. This means that stenographic dictation cannot occur while making a key sensitivity adjustment and also means that the screen of the Mira cannot be viewed while in this adjustment mode. More importantly, after an adjustment has been made, the top must be closed before the user can check to see if the adjustment was adequate. So, the adjustment process must be repeated on a trial-and-error basis for each key, which can be extremely time-consuming. FIGS. 4 and 5 illustrate the depth-of-stroke adjustment wheel and the tension adjustment wheel, respectively. It is noted that the stroke adjustment wheel is hard to reach and cannot be accessed unless the top of the machine is opened. The stroke adjustment wheel is stiff and only permits a small fraction of adjustment as compared to the entire key stroke. Practically, a user cannot type with the machine while an adjustment is being made. Similarly, the tension adjustment wheel in FIG. 5 only allows a small adjustment. Again, the top of the machine must be opened, making it impractical to write with the machine at the same time that an adjustment is being made.

In stenographic machines that are used in countries outside Europe, there are additional keys to the left of the two rear rows. These additional keys are at the same level as the keys in the rear two rows and correspond to different characters that are not needed for English transcription. These keys, in use, can be depressed individually or together. When such machines are used by United States-trained stenographers, these keys are a distraction and/or get in the way of their typing. Accordingly, most machines sold in the United States do not include these keys. In other machines, such users commonly remove these keys.

FIG. 6 illustrates another prior art stenographic machine referred to as the Treal TR, manufactured by Word Technologies. This writer is not adjustable and has plunger-activated keys. There are three holes 60 shown on the left-hand side of FIG. 6 where the extra set of keys were positioned before they were removed. These keys existed in the same plane as the other keys of the three 10-key rear rows. Another prior art writer similar to this machine is called the Gemini, manufactured by the Neutrino Group.

Prior art keyboards were comprised of a set of individual key assemblies 21. These key assemblies 21 each contained a key pad 22 fixedly connected to a key lever 24. The key lever 24 was pivotally connected to the writer to enable a keystroke when depressed. A height of each key pad 22, in the prior art key assemblies 21, was controlled only by the angle at which the key lever 24 exited the housing 26 of the writer. But, when that angle was adjusted, the upper surface of the key pad 22 was no longer parallel to the remaining key pads 22. As such, individual key pads 22 in the prior art writers were not adjustable in any way that kept the upper surface parallel to all of the other upper surfaces of the key pads 22. It would, therefore, be beneficial to provide a way to adjust individual keys so that the upper key pad surface could moved up and down as desired.

As described, prior art stenographic machines have the vowel keys in the lower plane than the other keys. Many reporters, however, find it more comfortable to write with all of the keys in the same plane. Adjustment of the vowel keys has heretofore not been possible. Accordingly, the reporters, themselves, have taken to raise their own vowel keys by adding pads to them. But, with reporters who like to raise their vowel keys, the heights of the keys are not consistently desired. Accordingly, it would be desirable to be able to provide adjustable-height keys having intermediately raised, equally raised, or even extended heights for the vowel keys.

Concurrently, some reporters desire to lower the height of the vowel keys. Prior art writers, however, did not permit this without switching out the entire key lever. It is important to note that to switch out entire such key levers the writers needed to be returned to the manufacturer. Accordingly, it would be desirable to permit the user to lower and raise the height of the keys in a custom way without returning the device to the manufacturer every time adjustment was desired.

Thus, a need exists to overcome the problems with the prior art systems, designs, and processes as discussed above.

SUMMARY OF THE INVENTION

The invention provides devices and methods for adjusting heights of one or more keys of a keyboard that overcome the hereinafore-mentioned disadvantages of the heretofore-known devices and methods of this general type.

As set forth above, prior art stenographic machines sometimes include keys to the left of the 10-key rows. However, these keys are used solely for different characters and are available only for international markets; they are not used for English transcription. The present invention places a single key to the left of each of the two rear rows (these keys are in the second and third rows when start of counting begins at the front row). These two keys, in contrast to any prior art mechanism, have a top surface that is substantially lower than the top surface of the keys in the two rear rows. In particular, the top surfaces of these additional keys are at a level lower than the greatest depression level of any of the keys in the two rear rows. As such, even a full depression of the two left-most keys (corresponding to the "S" phonetic sound) will not permit the wide-pinkied user to accidentally depress either of the two additional left keys. In addition, in the normal writing position, the user will not be able to feel these extra keys, and, therefore, will not misplace his/her hands on the keyboard, which would result in inaccurate fingering.

The systems disclosed use these two additional keys to expand the "vocabulary" of the standard stenographic keyboard, shown, for example, in FIG. 10. With these additional keys, when any one or both are depressed, three additional keyboards and, therefore, at least 72 additional keys, can be accessed, much like the control, shift, and alt keys on a conventional computer keyboard. If a third key is added in this new column next to the fourth (top) row key, then even more key possibilities become available to the user. These additional keys can be used to represent any character or character set. They can also be used in combination with other standard keys to create additional commands, much like the control, shift, and alt commands of computer keyboards. Additional keys are also necessary for some foreign stenographic theories. Even though the new keys are disposed at a level lower than the lowest depression level of the keys, the user can be trained to use these new keys in a way to make available these foreign stenographic theories.

Alternatively, the keys can be configured to rest at two or more different heights depending on the user's choice. In another alternative exemplary embodiment, the shorter keys can be replaced with taller keys that, when installed, have a top surface at a height equal to the top surface height of the other keys, or even higher. In this way, foreign theories of stenography can be accommodated.

Four additional keys can increase the different possible combinations in one stenographic stroke from $2^{24}$ to $2^{27}$. While $2^{24}$ is already a huge number, the practical number of combinations is much lower; it is limited by the human hand to a maximum of 20 bits out of the maximum of 24 bits. The keys added by the present invention dramatically increase the useful number of keys that can be combined into a single stroke. This increase allows the reporter to write faster because they can create many more practical single-stroke entries.

An additional feature of the present invention does not place the four vowel keys of the front row in a plane lower than the keys of the two rear rows. Raising these keys produces advantages that were not provided previously. For example, stress on the wrist is reduced. Also, raising the keys makes it easier for users with small hands to reach the more distant keys when the vowel keys are simultaneously depressed.

The keystroke device is used particularly with a stenographic or stenotype machine (e.g., for court reporters). In paper stenotype machines, when a court reporter lightly touched a key(s), then the paper would be printed, not with a clear print of the keystroke, but with a light or shadow keystroke. As used herein, the words "keystroke" or a "stenographic keystroke" include any possible actuation of a key device or set of key devices. In other words, the definition includes both recognized key actuations (whether for a single key or a set of more than one key) and any unrecognized, accidental, incorrect, and/or inadvertent actuation of a single key or a set of more than one key.

With the foregoing and other objects in view, there is provided, in accordance with the invention, an adjustable key assembly for a stenographic machine including a key cap having a first removable securing portion and a stenographic keyboard key lever having, a second removable securing portion cooperating with the first removable securing portion to removably hold the key cap thereat over a variety of different positions, a lever connection end having a pivoting connection shaped to attach to the stenographic machine in a pivotable manner and move between a steady-state raised position and a depressed lowered position, and an extension portion extending away from the second removable securing portion and to the lever connection end.

With the objects of the invention in view, there is also provided a stenographic machine including a housing, a stenographic processing unit in the housing, and a stenographic keyboard at the housing and operatively connected to the stenographic processing unit to record stenographic dictation by a user. The stenographic keyboard has a plurality of adjustable key assemblies pivotally connected thereto. Each key assembly has a key cap having a first removable securing portion and a stenographic keyboard key lever having a second removable securing portion cooperating with the first removable securing portion to removably hold the key cap thereat over a variety of different positions, a lever connection end having a pivoting connection attached to the stenographic keyboard to move between a steady-state raised position, and a depressed lowered position, and an extension portion extending away from the second removable securing portion and to the lever connection end.

In accordance with another feature of the invention, the key cap has a top surface and the first removable securing portion and the second removable securing portion are adjustably disposed with respect to one another to place the top surface of the key cap at different vertical heights with respect to ground.

In accordance with a concomitant feature of the invention, the key cap is a set of key caps each having a different sized first removable securing portion to place the key cap, when attached to the key lever, at different positions selected from at least one of a different height and a different length.

Although the invention is illustrated and described herein as embodied in devices and methods for adjusting heights of one or more keys of a keyboard, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which:

FIG. 13 is a perspective view of the key assembly of FIG. 10;

FIG. 14 is a perspective view of an exemplary embodiment of a key assembly according to the invention with a key pad having a second height;

FIG. 15 is a photograph of an exemplary embodiment of a key pad and fasteners according to the embodiment of FIG. 10;

FIG. 16 is a fragmentary, exploded, perspective view of the key assembly of FIG. 14;

FIG. 30 is a photograph of a perspective view of the keyboard sub-assembly of FIG. 17 from the left front side with the vowel keys in the lowered orientation;

FIG. 31 is a photograph of a perspective view of the keyboard sub-assembly of FIG. 17 from the left front side with the vowel keys in an intermediate orientation;

FIG. 32 is a photograph of a perspective view of the keyboard sub-assembly of FIG. 17 from the left front side with the vowel keys in the raised orientation;

DETAILED DESCRIPTION OF THE INVENTION

Figure 1:
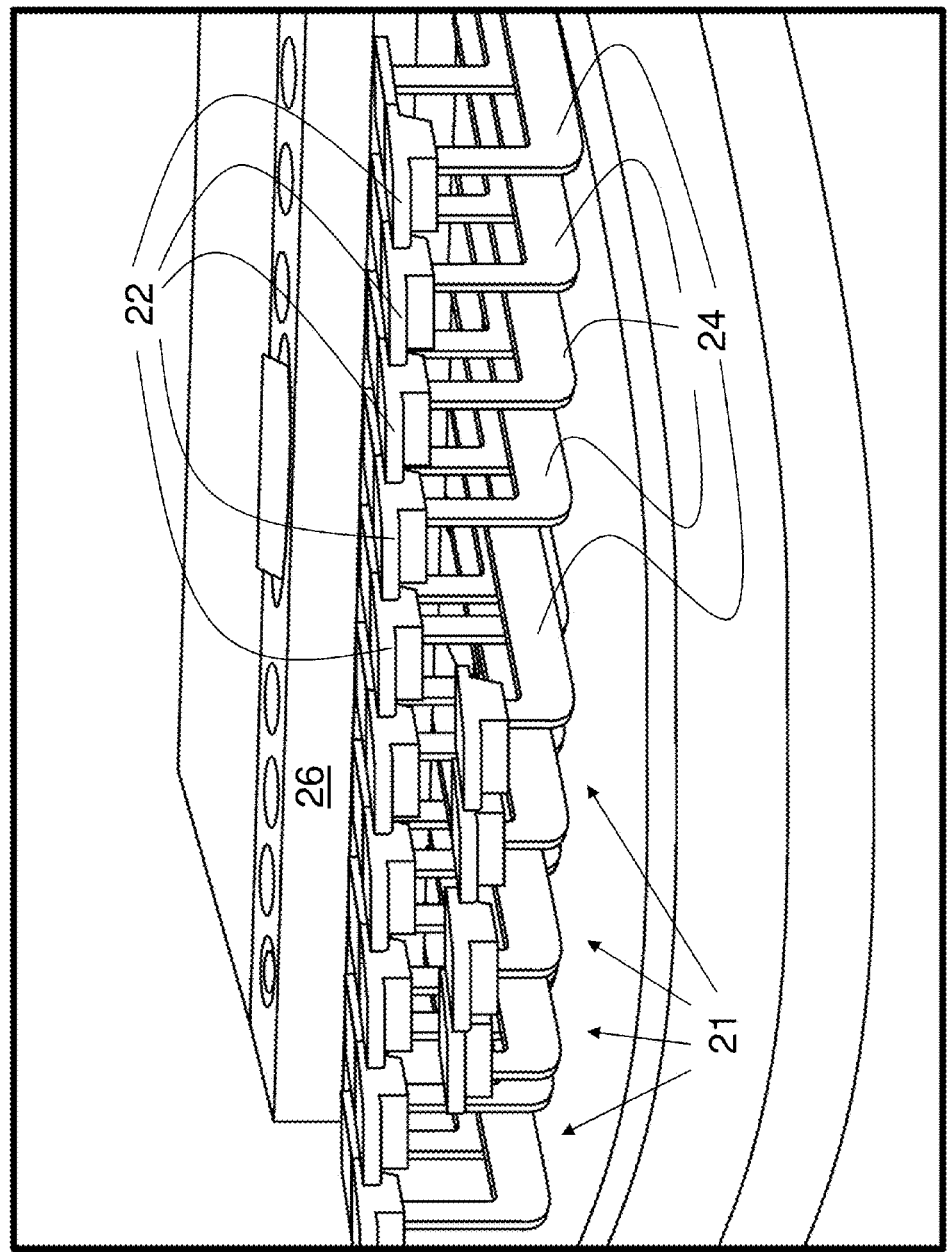
FIG. 1 is a fragmentary, perspective view of a prior art stenographic machine from the front.
Figure 2:
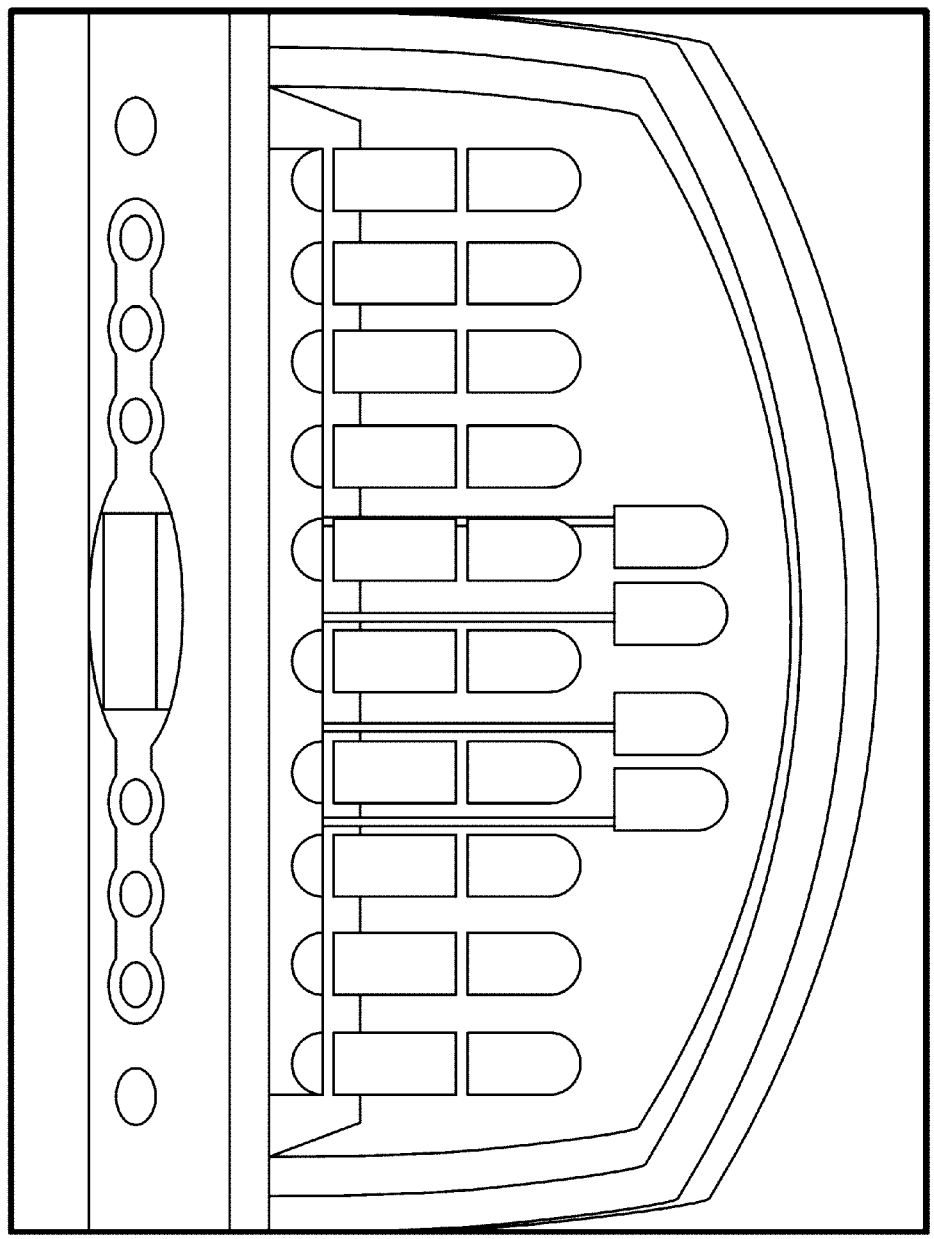
FIG. 2 is a fragmentary, perspective view of the prior art stenographic machine of FIG. 1 from above the front.
Figure 3:
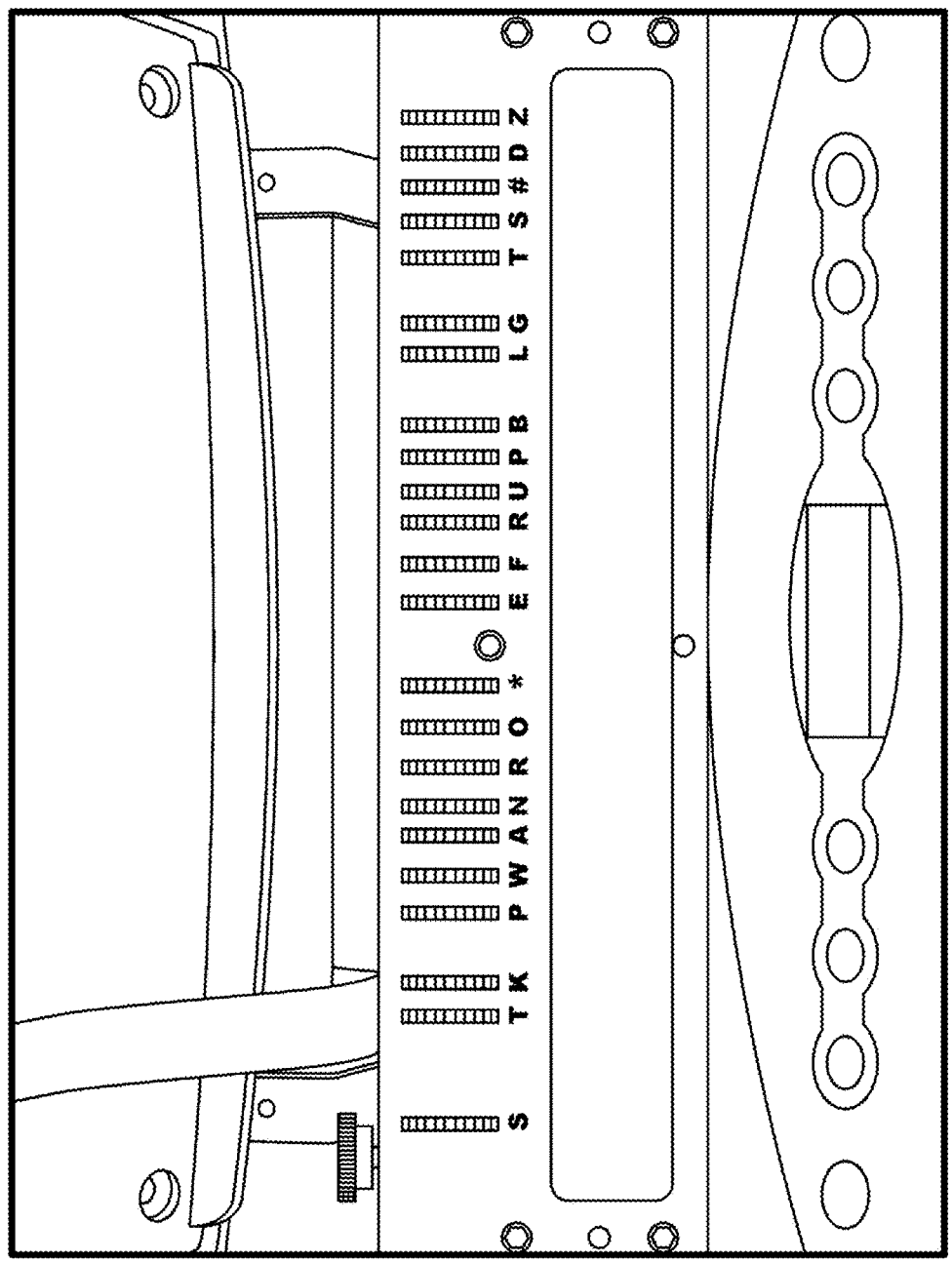
FIG. 3 is a fragmentary, perspective view of an interior portion of the prior art stenographic machine of FIG. 1 from above the front.
Figure 4:
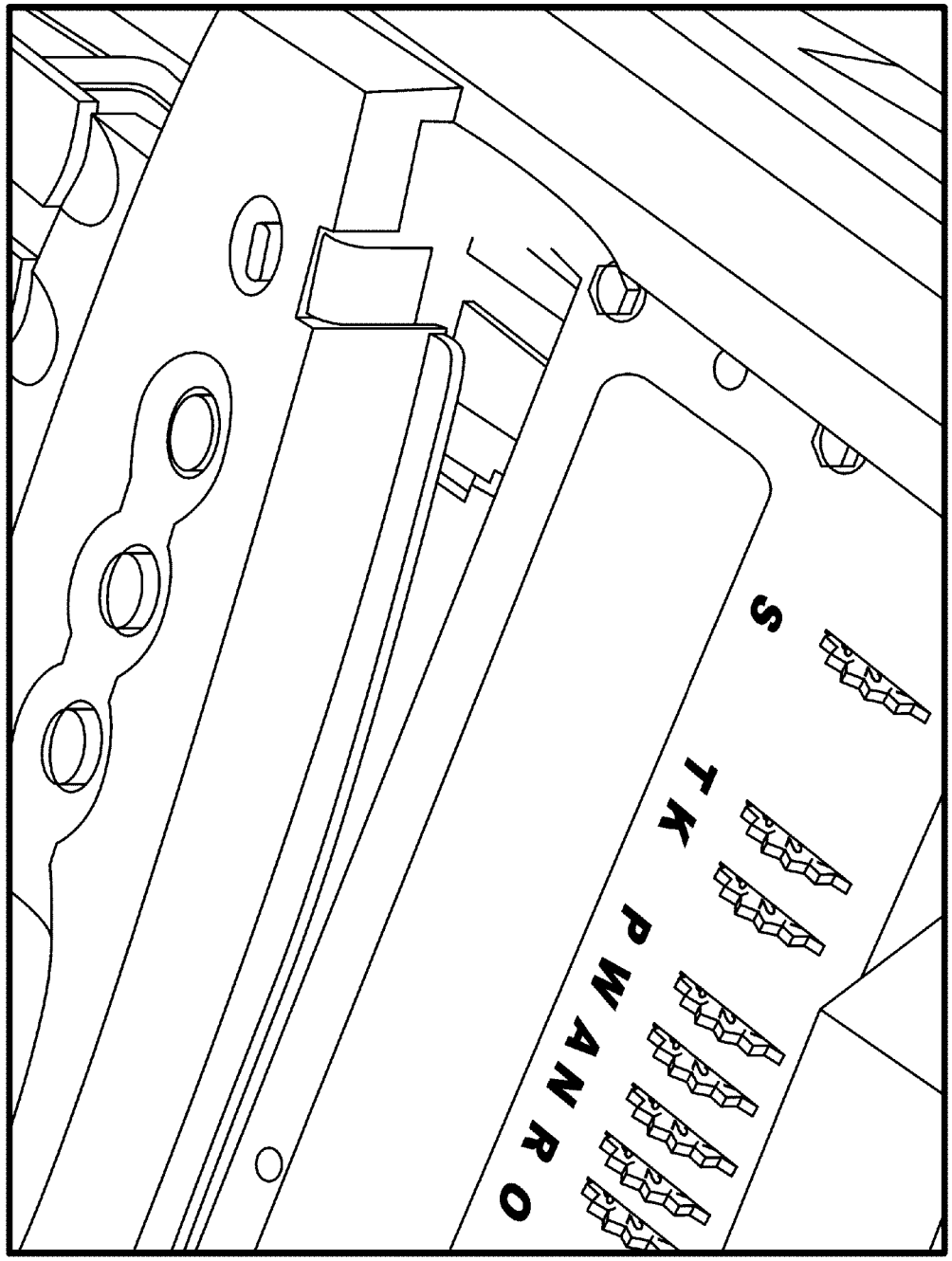
FIG. 4 is a fragmentary, perspective view of another interior portion of the prior art stenographic machine of FIG. 1 from above the rear.
Figure 5:
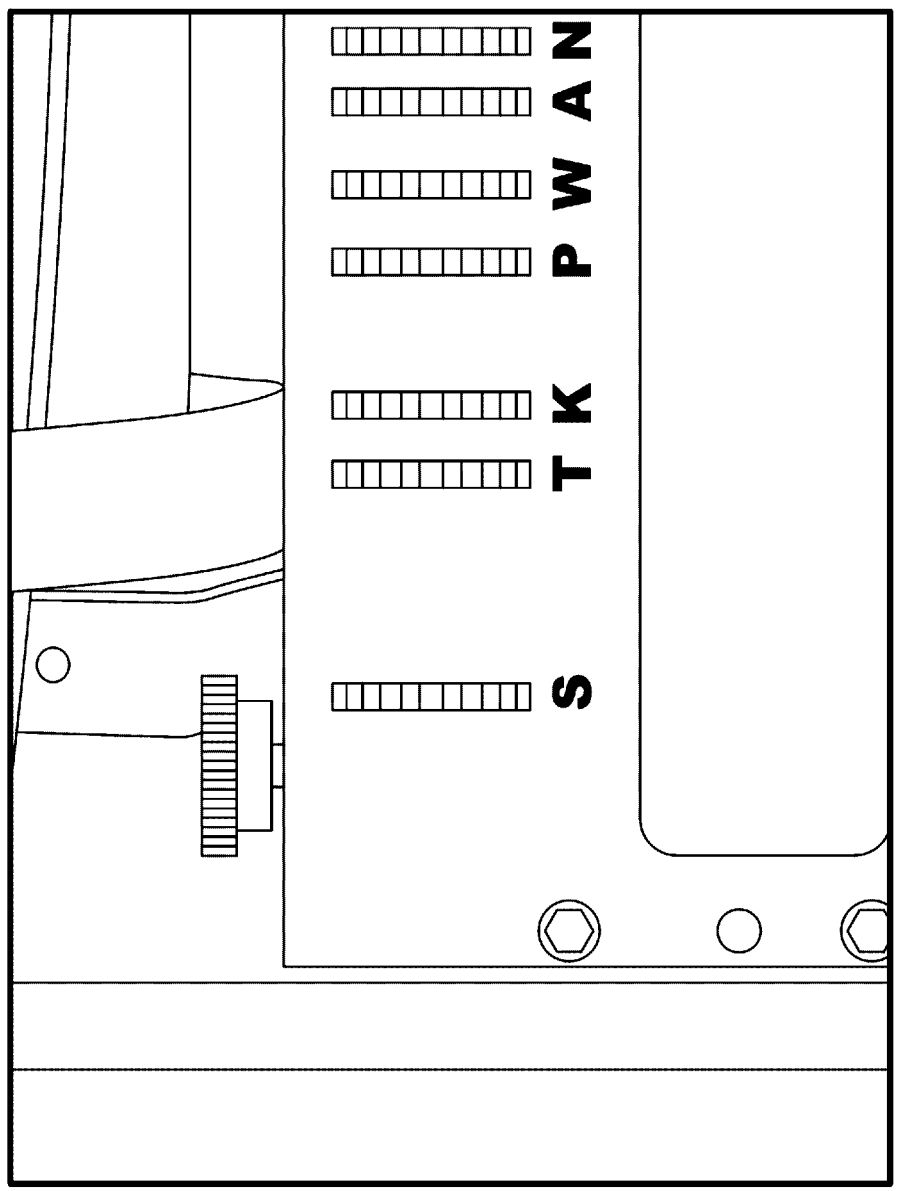
FIG. 5 is a fragmentary, enlarged, perspective view of a portion of the prior art stenographic machine of FIG. 3 from above the front.
Figure 6:
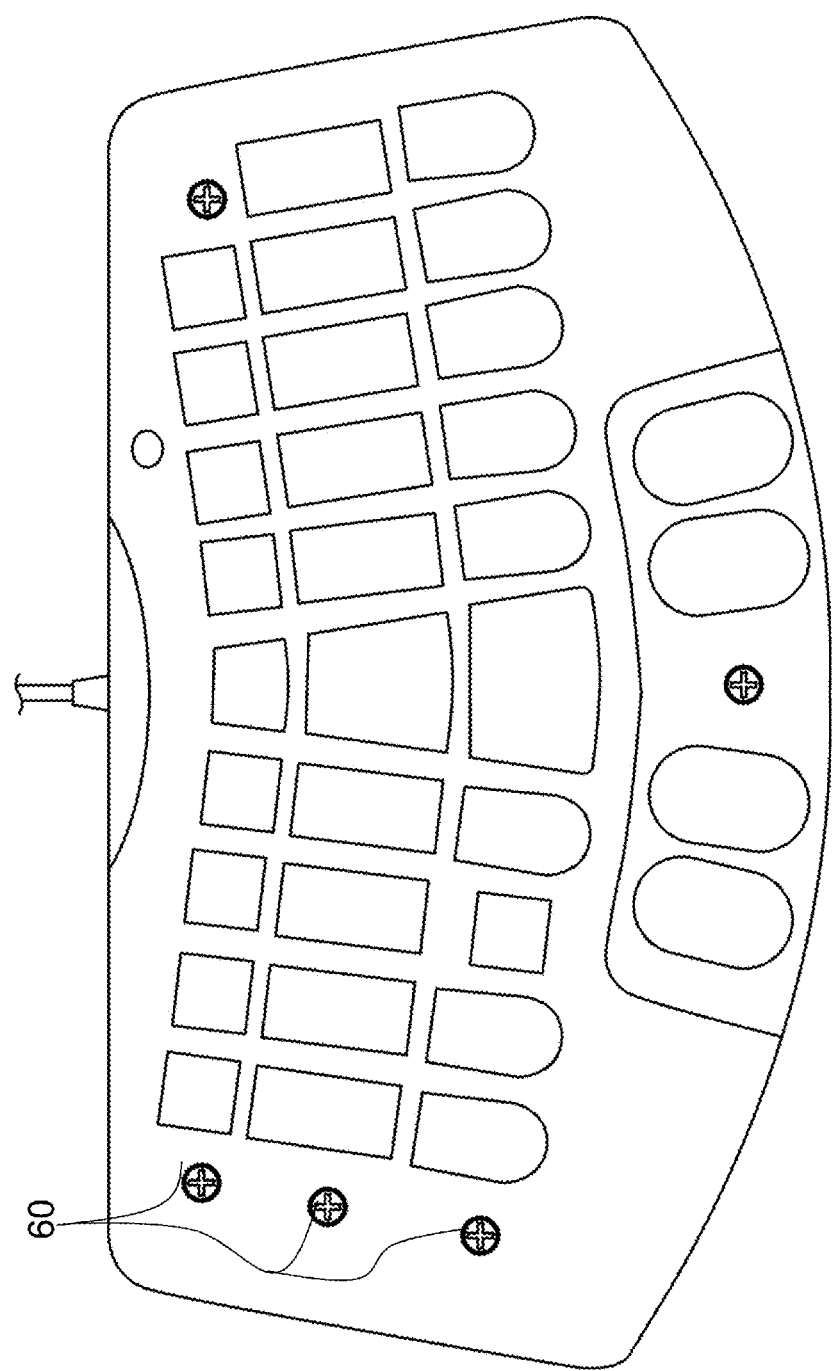
FIG. 6 is a fragmentary perspective view of another prior art stenographic machine from above the front.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

It will be appreciated that embodiments of the invention described herein may be comprised of one or more conventional processors and unique stored program instructions that control the one or more processors to implement, in conjunction with certain non-processor circuits and other elements, some, most, or all of the functions of the powered injector devices described herein. The non-processor circuits may include, but are not limited to, signal drivers, clock circuits, power source circuits, and user input and output elements. Alternatively, some or all functions could be implemented by a state machine that has no stored program instructions, or in one or more application specific integrated circuits (ASICs) or field-programmable gate arrays (FPGA), in which each function or some combinations of certain of the functions are implemented as custom logic. Of course, a combination of these approaches could also be used. Thus, methods and means for these functions have been described herein.

The terms "program," "software," "software application," and the like as used herein, are defined as a sequence of instructions designed for execution on a computer system. A "program," "software," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the figures of the drawings in detail and first, particularly to FIG. 7 thereof, there is shown a block circuit diagram of a stenographic device according to the invention. The stenographic machine 1 has a keyboard 10 having plurality of keystroke devices, which are connected to an on-board proceeding unit including a microprocessor 2. A memory 3 (e.g., RAM, ROM, hard drive, removable memory) is connected to the microprocessor 2 for storing data and supplying stored data to the microprocessor 2 and for storing and executing software. A display 4 is connected to the microprocessor 2 for displaying stenographic and/or translated data and for displaying the shadows determined/detected by the microprocessor 2. The microprocessor 2 controls all electronic operations including receiving stenographic data and shadow data, storing all data, and displaying all desired processes, which processes can include the stenographic and/or level data itself, indications that data is being stored, indications that data is being translated, translated stenographic output, and in many others.

Depending upon the configuration of the stenographic device, a translator 5 can be on-board the device and, therefore, it is directly connected to the microprocessor 2 for translating stored or incoming (real-time) stenographic data. Thus, input electronics for the keystroke device can be directly connected to the same processor 2 that controls the translation program, and the functions of input, shadow determination, translation, and correction/editing can be performed on a single unit 1.

If the translator is not on board the stenographer's device 1, then the device 1 can be connected to an external stenographic translator 6, in which case the translator 6 is separate from the stenographic device 1 and information stored in the memory 3 is relayed 7 either by transfer through an intermediate media (e.g., floppy disk, CD/DVD, micro-drive, flash drive), in which case the device will have a floppy drive, CD/DVD drive, USB port, Firewire port, etc., or wirelessly through some kind of communication data link (e.g., a Bluetooth, ISDN, Internet, or other wireless data link), in which case the device will have an on-board transceiver 8 or other communications device.

In either case, the translator 5, 6 translates the stenographic data to the respective language (e.g., English). When the device 1 is associated directly with a translation system, translation occurs quickly so that the stenographer can view his/her stenographic keystrokes in almost real-time and in relatively understandable English (dependent upon the quality of the word/translation processor). The memory 3 will store the translation locally 3, 11 and/or externally 7, 9.

Figure 7:
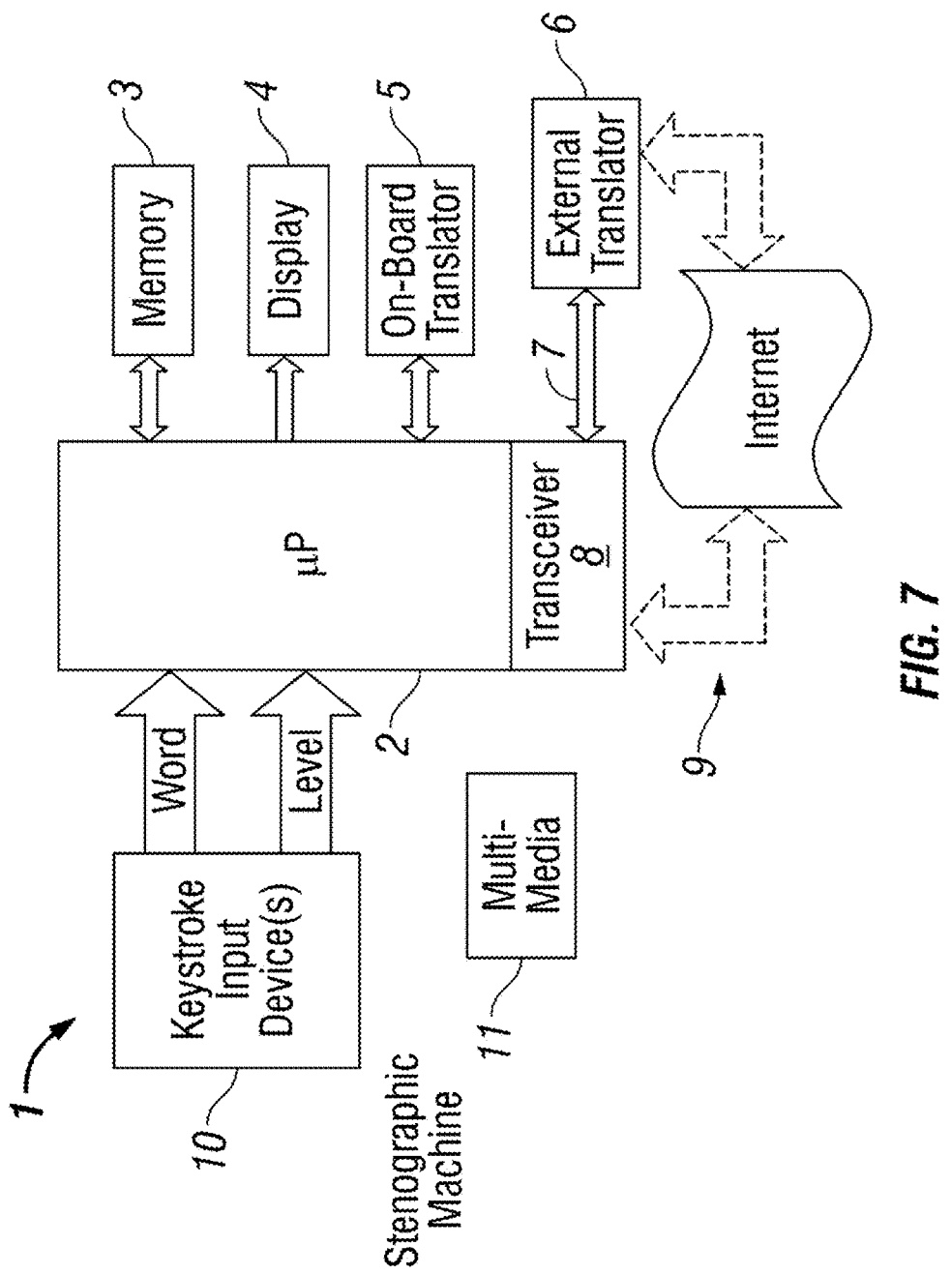
FIG. 7 is a block circuit diagram of an exemplary embodiment of a stenographic system according to the invention.

FIG. 7 further illustrates the stenographic device 1 and an embodiment 9 for connecting the device to an external stenographic translator 6. In the example of FIG. 7, the translator 6 is connected to the Internet and is housed at a location different from the stenographer's location. In such a networked configuration, the transceiver 8 can utilize a bi-directional data channel to transmit the un-translated stenographic data to the external translating computer 6 (represented by the dashed arrows), whether in real time or delayed. The translating computer 6 can, then, translate the stenographic data and transmit a translated data stream back to the device immediately or at a later time and to any other device that can be connected (directly or wirelessly) to the translating computer (also represented by the dashed arrows). Thus, the stenographer can have almost real-time analysis even without having an on-board translator.

One example of such a system 9 provides the stenographic device 1 with a connection (e.g., a direct or wireless transceiver 8) to the Internet and the external translating computer 6 with a connection (direct or wireless) also to the Internet. Thus, commonly available Internet connection devices available at the location where the stenographer is taking data can be used to facilitate quick and inexpensive translation of stenographic data without having to store the translation software on the stenographer's machine 1.

When the device 1 has an integrated word processing system, then the functions of dictation, translation, and editing of the translation can be performed by the stenographer on a single machine.

The device 1 can also include a multi-media recorder 11 that can store, in an on-board memory or the memory 3, digital video images and/or audio data. By recording the audio and/or video of the subject(s) of the stenographer on the device, it becomes possible to associate a portion of a multi-media file with a stenographic stroke. Such recording and coordination of stenographic and video and/or audio data allows the stenographer to playback images of and/or sounds from the subject to assist in the accurate translation of the stenographic keystrokes. Such multi-media data can also be transmitted to other computers and/or locations through network connections, for example, over the Internet, by wireless connections, such as Bluetooth, by direct connections, such as RS-232, universal serial bus, IRDA, Firewire, or by any other available data communications measures to assist the stenographer in accurate translation of the stenographic data.

Figure 8:
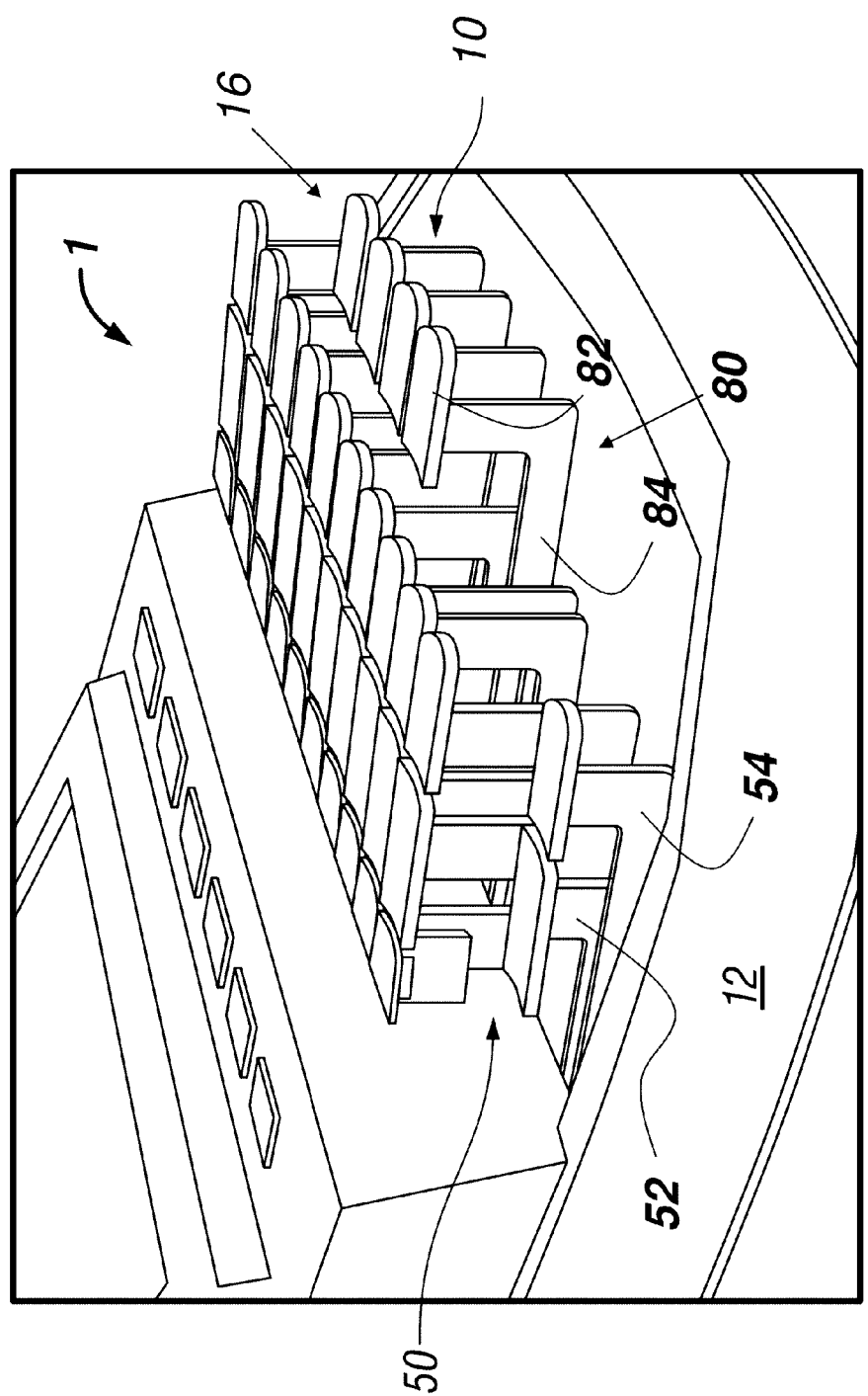
FIG. 8 is a fragmentary, perspective view of an exemplary embodiment of a stenographic machine according to the invention from a front left side.
Figure 9:
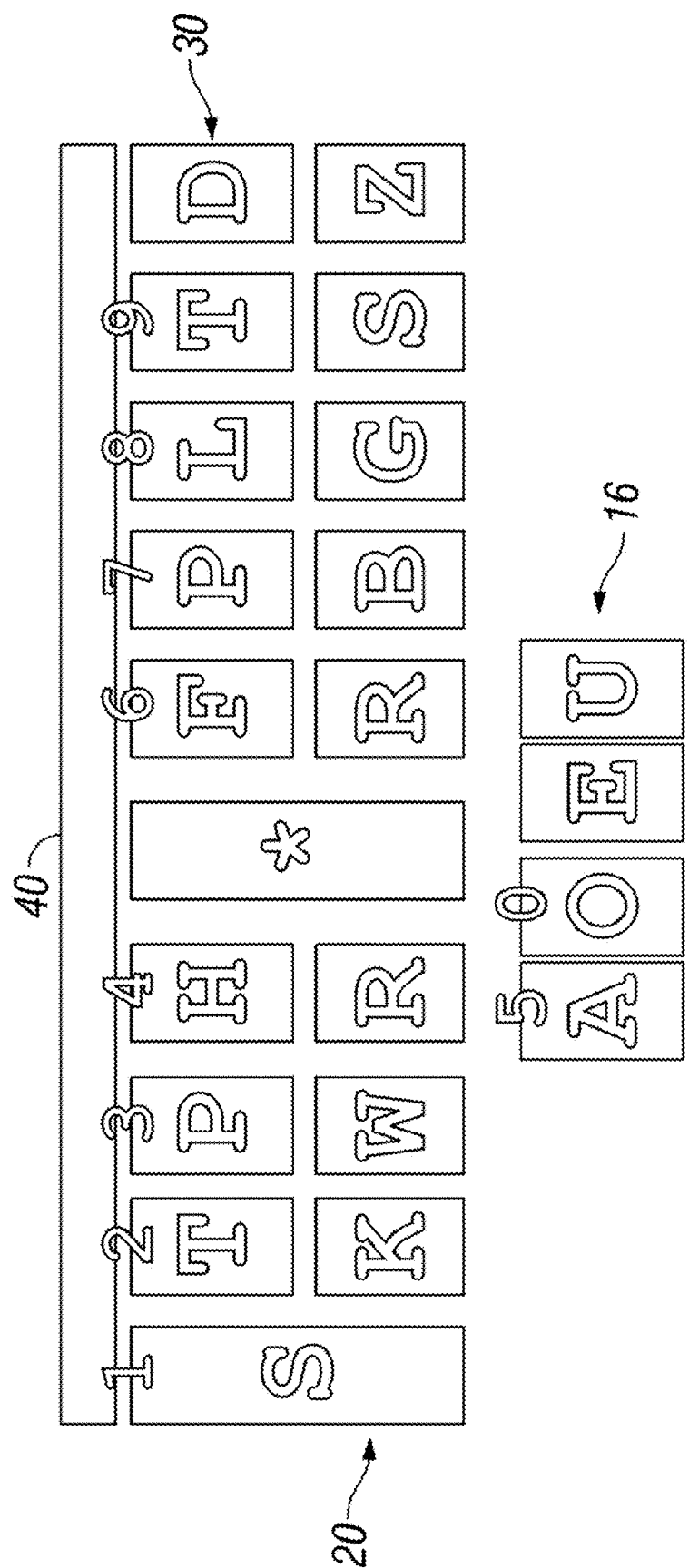
FIG. 9 is a diagrammatic illustration of a standard stenographic keyboard.

FIG. 8 illustrates a side view of a first embodiment of a stenographic writer 1 described herein. The writer 1 has a housing 12 and a stenographic keyboard 10. The keys shown in FIG. 8 are illustrated in their normal rest state or undepressed state. A conventional stenographic keyboard has four rows, the front row 16 having four keys corresponding to vowels and two rear rows 20, 30 of ten keys each as shown in FIG. 9. The two left-most keys correspond to the same letter and, therefore, are shown in FIG. 9 as a single key. On traditional machines, an "S" is produced whether the reporter presses the key in the second row or the third row because these keys are tied together—they are essentially one key. By adding at least one additional key in the present invention, the reporter has the option of defining every other key differently, if depression of that key changes the state of one or more other keys. The benefits arise by splitting the "S" key into two keys at the far left-hand side of the keyboard 10. See, e.g., FIG. 8. The inventive keyboard also employs the same separation with the asterisk key, located at the middle of the keyboard 10. On traditional machines, although it might appear that there are two keys in the middle, they are, in fact, tied together and generate the same code.

The fourth row 40 of keys can take any form but is, commonly, a single key having a width equal to the ten adjacent keys of the rear rows 20, 30. This single key 40 can, in another exemplary embodiment, be a set of keys as shown in FIG. 8, each having a separate corresponding definition. As used herein with respect to the keys of the keyboard 10, "rear" is a position that is further away from the user than keys in the "front" of the keyboard 10.

With respect to FIGS. 8 and 9, the four vowel keys are shown in a front or first row 16 and, in the exemplary embodiment of FIG. 8, they are positioned in a conventional lower orientation or position. Here, "lower" is used as a relative word to compare the top surface of the keys in the first row 16 to the top surface of the keys in the second, third, and fourth rows 20, 30, 40, the top surfaces of which are all at the same height.

The keyboard 10 described herein includes a novel new side column 50 of two additional keys 52 and 54, which are referred to herein as control keys.

The keys in the second, third, and fourth rows 20, 30, 40 can each be depressed to a lower-most position. The top surface of these keys, when in this lower-most position, is higher than the top surface of the control keys 52, 54 when the control keys 52, 54 are not depressed. As such, when the left-most keys in either of the second, third, and fourth rows 20, 30, 40 are depressed, a finger that is on the left edge will not be able to depress either of the two control keys 52, 54.

In other words, the user must make a conscious decision to depress either or both of the control 52, 54 keys.

The control keys 52, 54 have various uses in the described writer 1. One exemplary use expands the "vocabulary" of the stenographic keyboard defined by the first to fourth rows 16, 20, 30, 40. With the control keys 52, 54, when any one or both are depressed, three additional keyboards can be accessed. Therefore, using the programming of the control system of the writer 1 to assign a different definition to each key when either the first control key 52, the second control key 54, or both control keys 52, 54 are depressed adds 72 additional keys to the twenty-four key original keyboard.

The control keys 52, 54 can be configured as press-on/press-off keys so that, when pressed once, they turn on and, upon a second press, they turn off. This feature is beneficial, for example, if non-activation of the keys 52, 54 is an English keyboard where activation of one of the two control keys 52, 54 turns the keyboard into a Spanish keyboard. The press-on/press-off function can be either mechanical or electronic. More specifically, once pressed, the key can stay depressed until it is pressed a second time, where it will physically return to its original starting height. Alternatively, in the electronic embodiment, once the key is depressed once, a "flag," or bit is set, indicating the transition from a rest state to the depressed state. In this electronic exemplary embodiment, although the key physically returns to the starting rest state, the status of the key is "depressed." To return the key to its original state, the key is transitioned again from the rest state, to the depressed state, and back to the rest state.

The novel keyboard 10 is comprised of a set of individual key assemblies 100 shown, for example, in FIGS. 8, 10, 13 and 14. Like prior art key assemblies 21, the key assemblies 100 of the invention shown in FIG. 8 each contain a key pad 82 fixedly connected to a key lever 84 with the key lever 84 being pivotally connected to the writer 1 to enable a keystroke when depressed. This is where the similarity ends. A height of each key pad 82, however, is not controlled only by the angle at which the key lever 84 exited the housing 12 of the writer 1. Rather, each individual key pad 82 is adjustable in a way that keeps the upper surface parallel to all of the other upper surfaces of the key pads 82.

Figure 10:
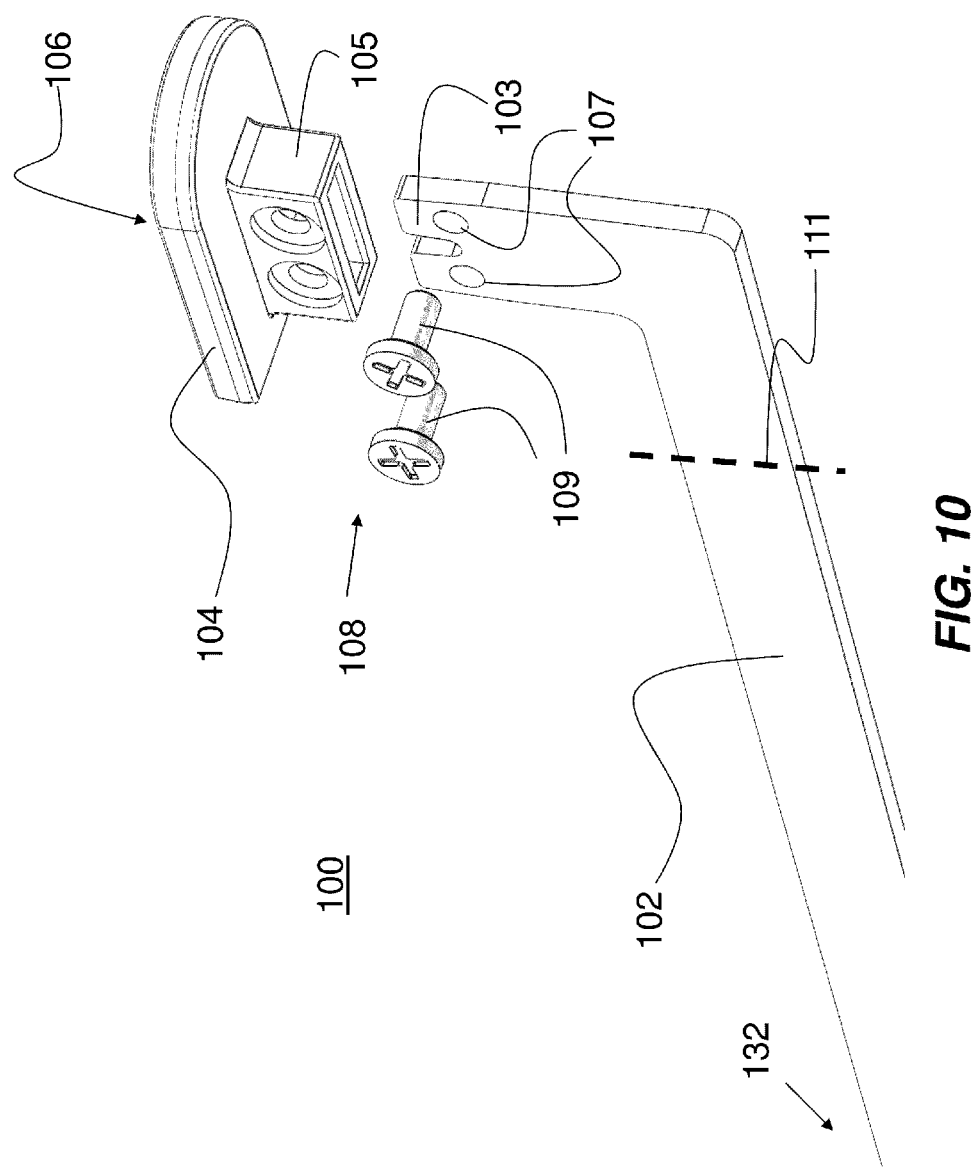
FIG. 10 is a fragmentary, exploded, perspective view of an exemplary embodiment of a key assembly according to the invention with a key pad having a first height.
Figure 11:
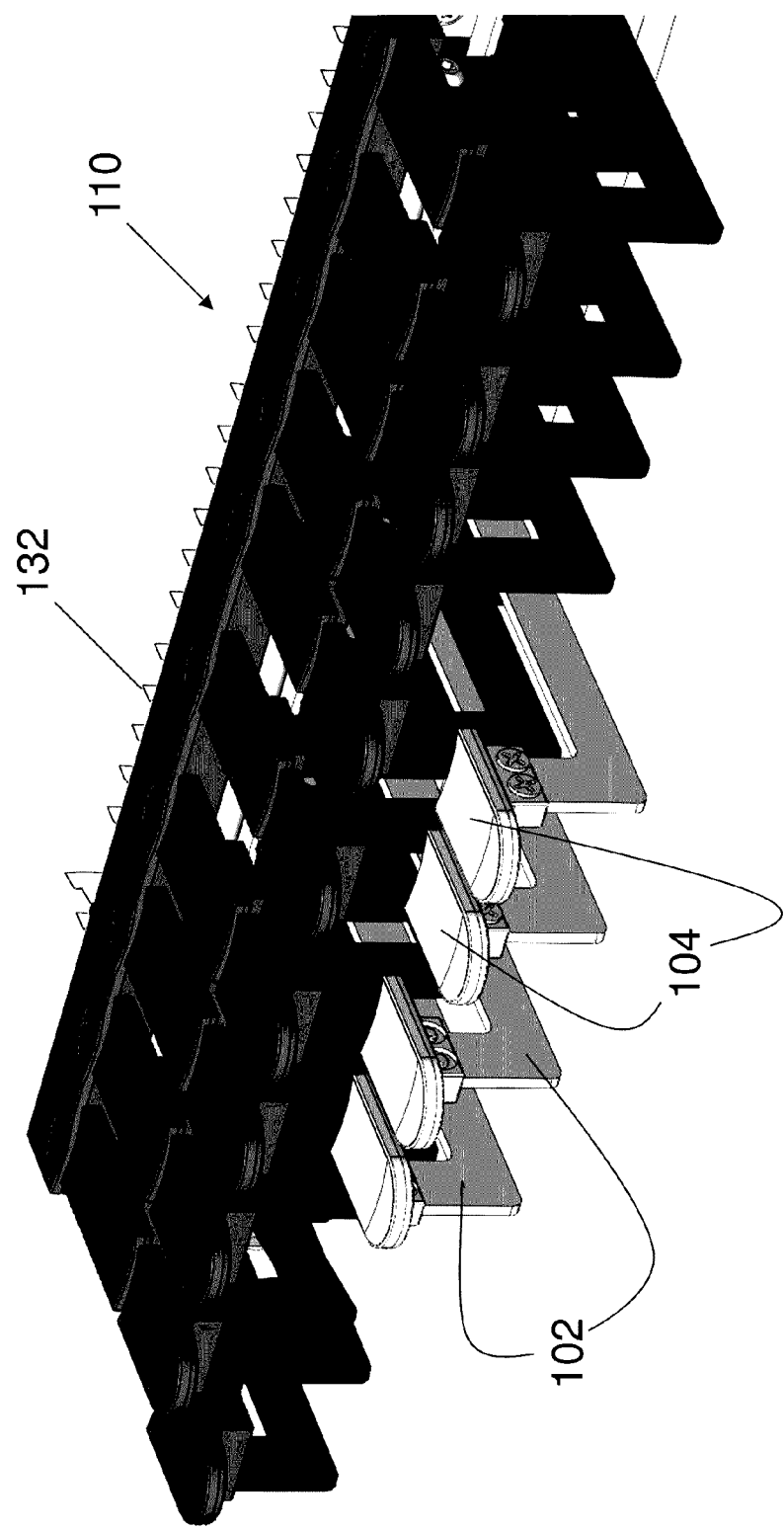
FIG. 11 is a perspective view of an exemplary embodiment of a keyboard sub-assembly of a stenographic machine according to the invention from above a front right side.
Figure 12:
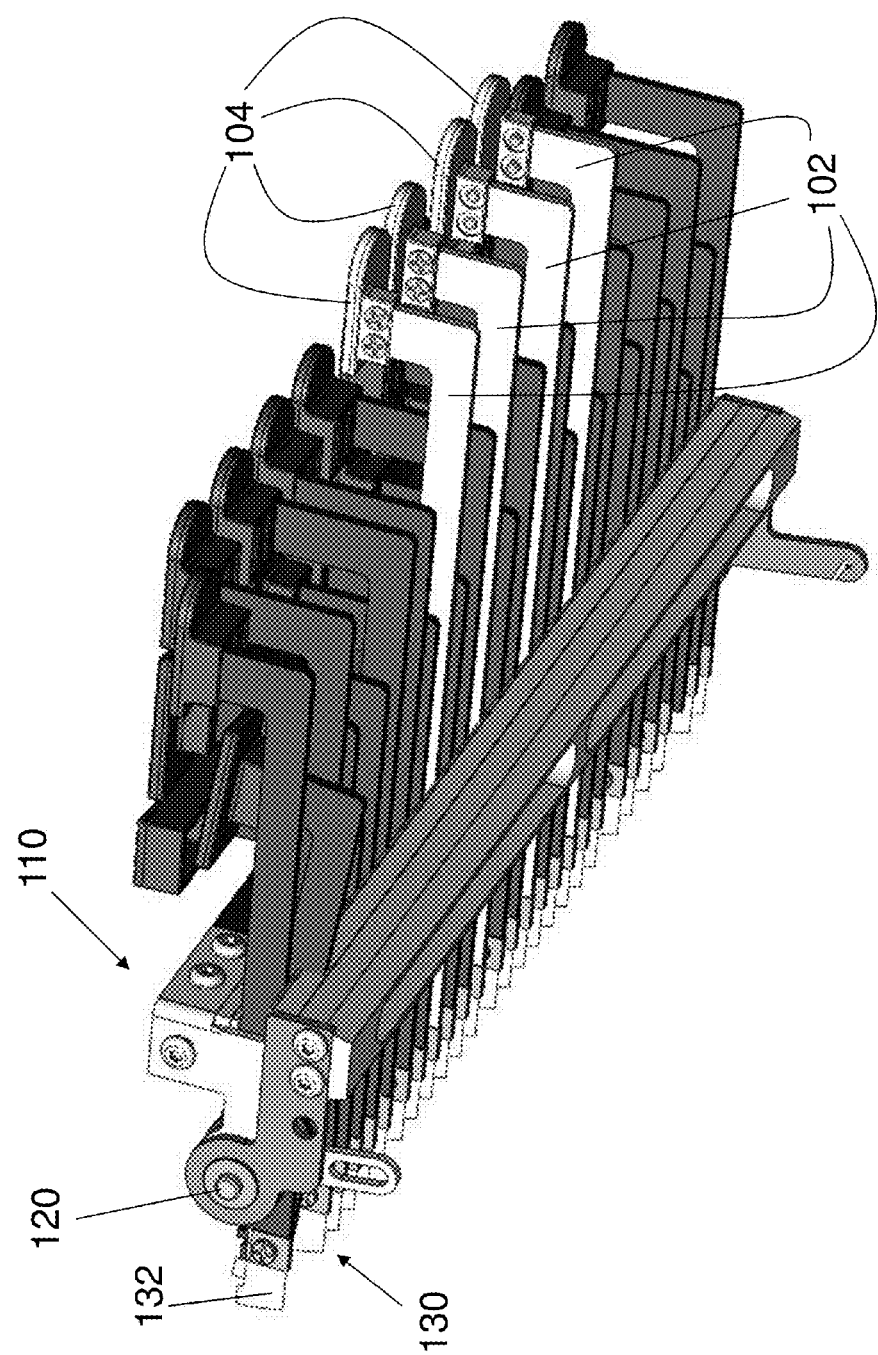
FIG. 12 is a perspective view of the keyboard sub-assembly of FIG. 11 from below a front left side.
Figure 17:
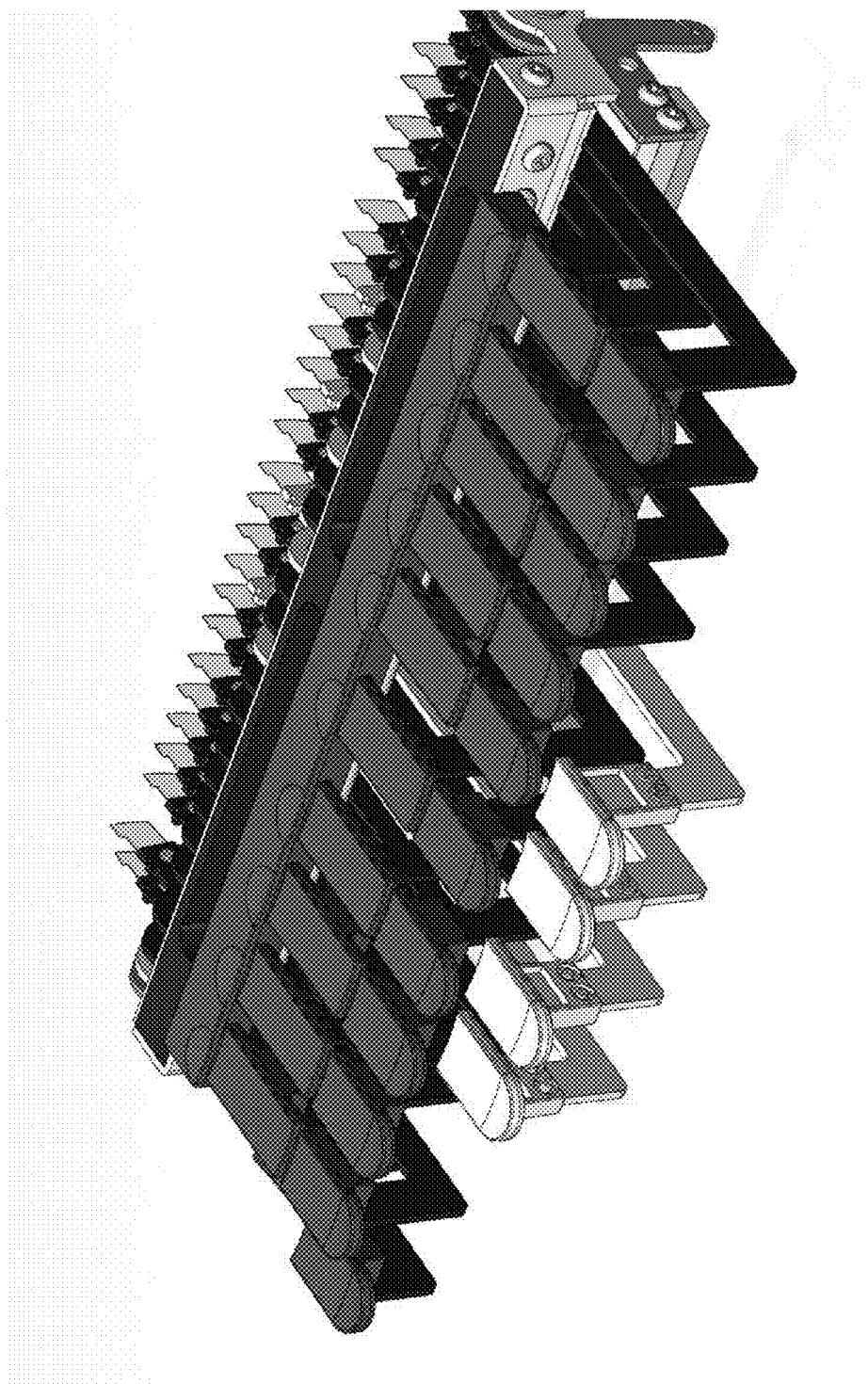
FIG. 17 is a fragmentary, perspective view of another exemplary embodiment of a keyboard sub-assembly of a stenographic machine according to the invention from above a front right side.
Figure 18:
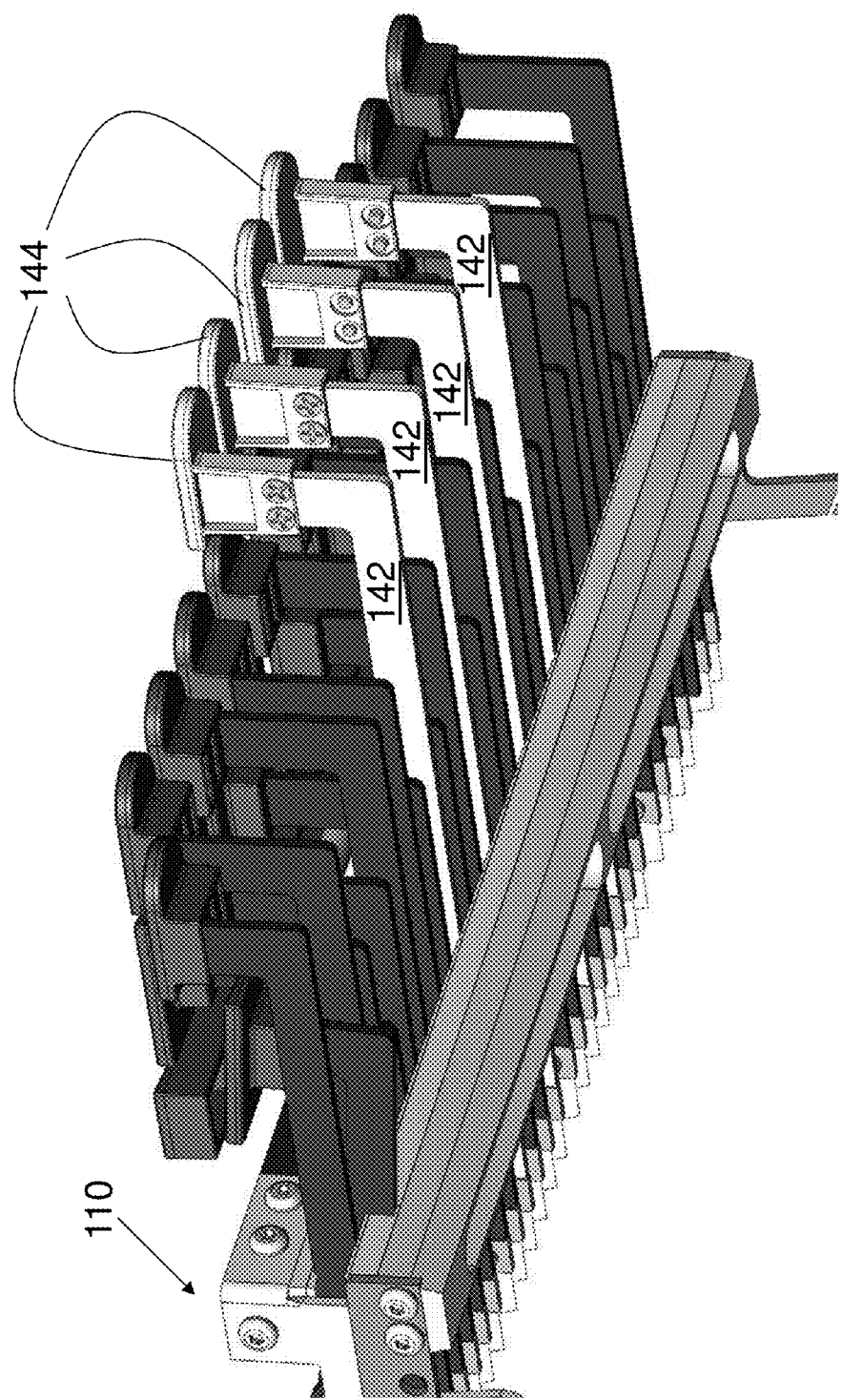
FIG. 18 is a fragmentary, perspective view of the keyboard sub-assembly of FIG. 17 from below a front left side.
Figure 19:
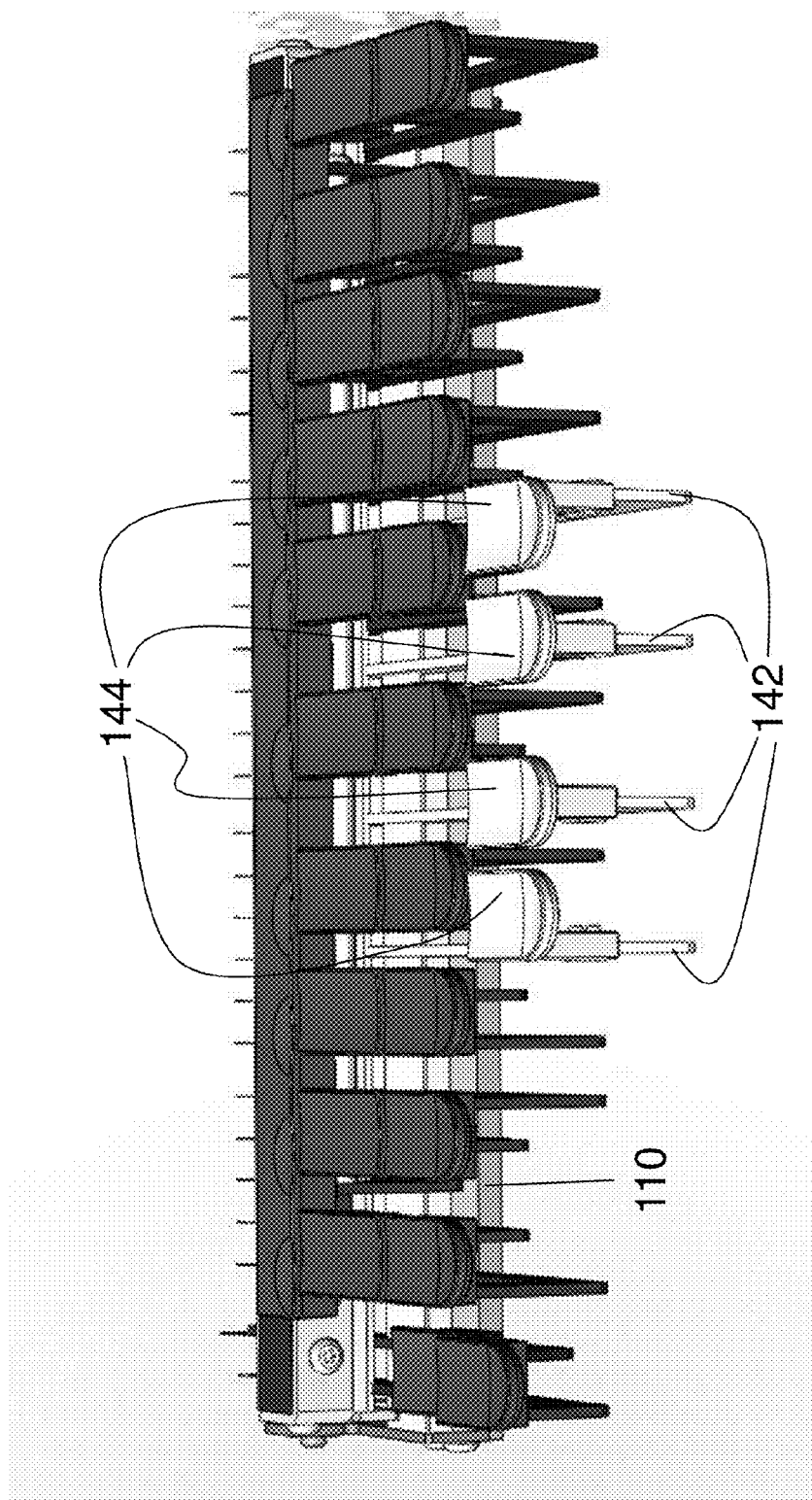
FIG. 19 is a perspective view of the keyboard sub-assembly of FIG. 17 from above a front.
Figure 20:
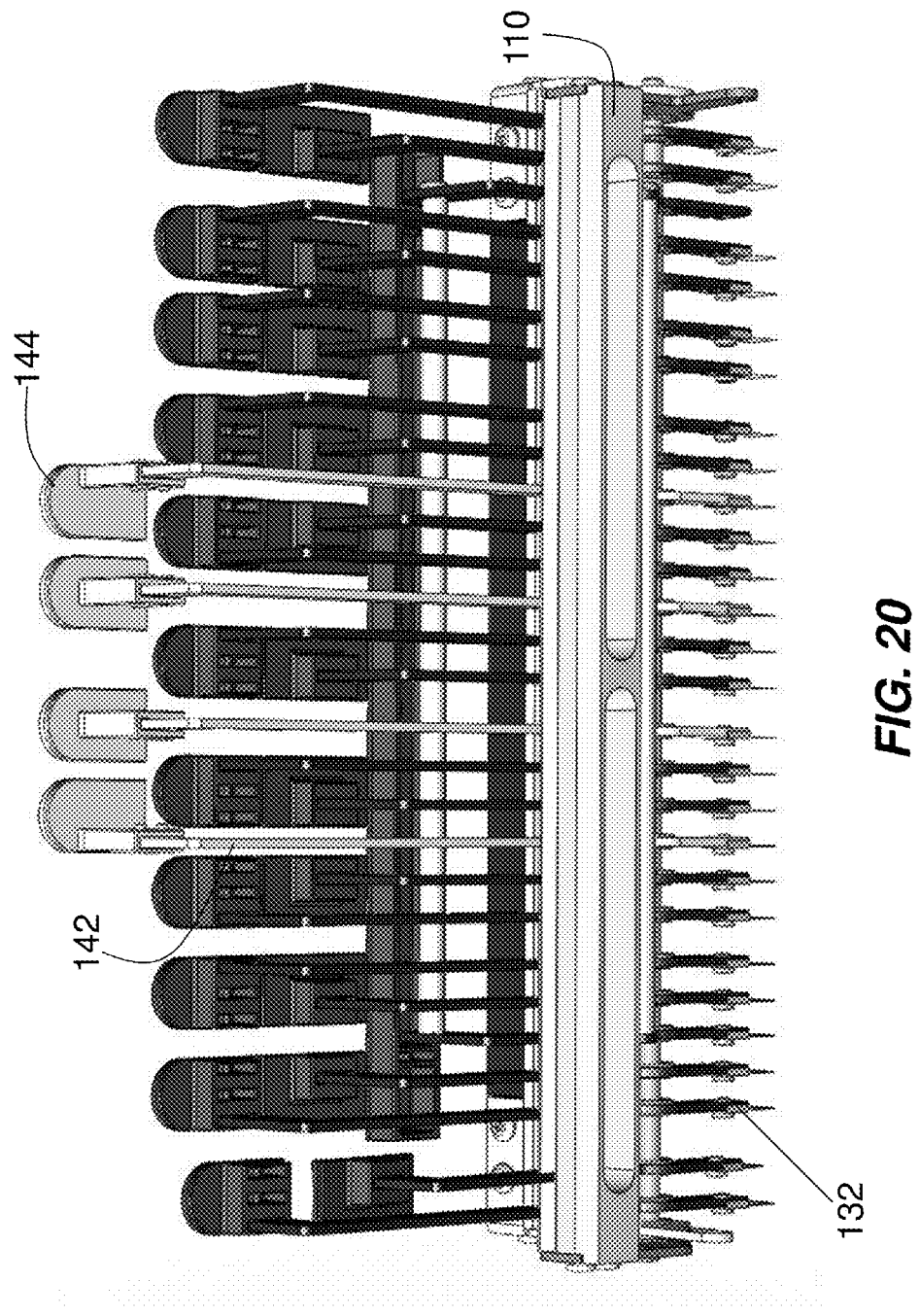
FIG. 20 is a perspective view of the keyboard sub-assembly of FIG. 17 from below the front.
Figure 22:
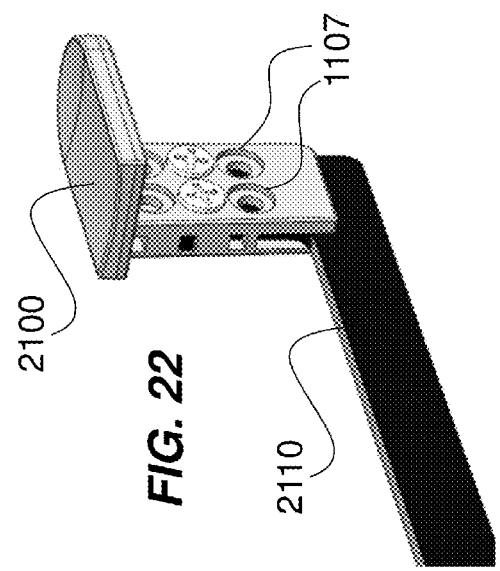
FIG. 22 is a perspective view of sub-assembly of FIG. 21 with the key pad at an intermediate setting.
Figure 21:
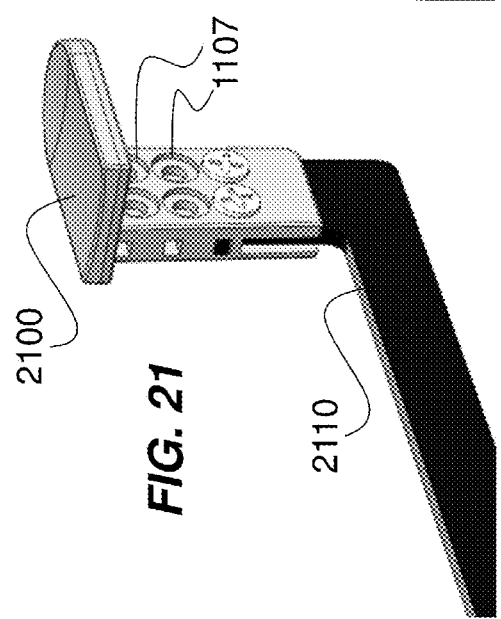
FIG. 21 is a perspective view of an alternative exemplary embodiment of a key pad, key level, and fastener keyboard sub-assembly with the key pad at a highest setting.
Figure 23:
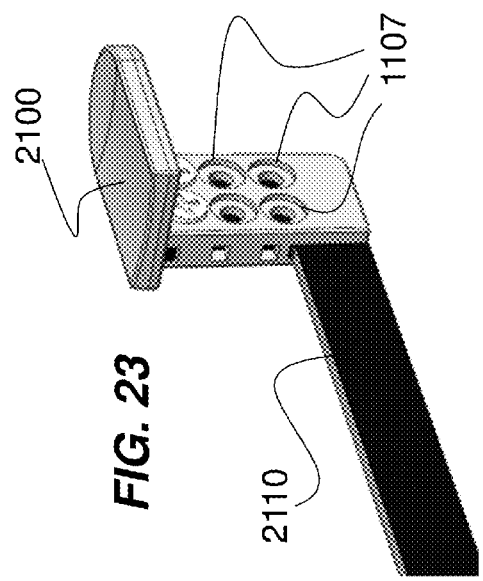
FIG. 23 is a perspective view of the sub-assembly of FIG. 21 with the key pad at a lowest setting.
Figure 25:
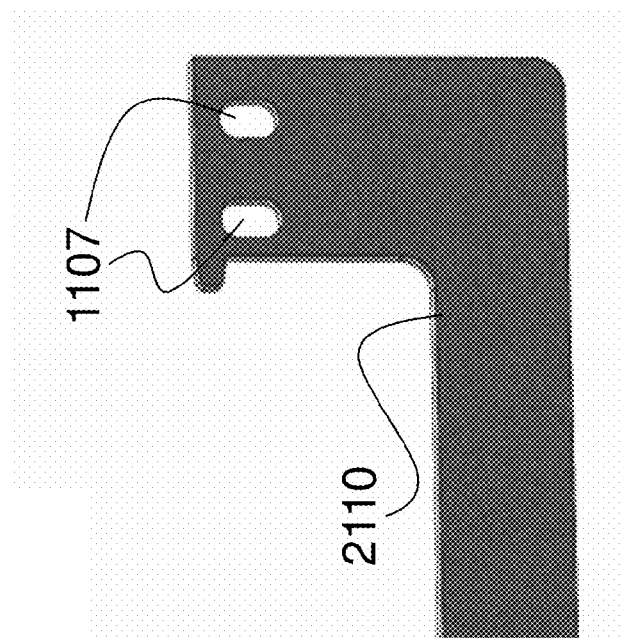
FIG. 25 is a side elevational view of a key lever portion of the sub-assembly of FIG. 21.
Figure 24:
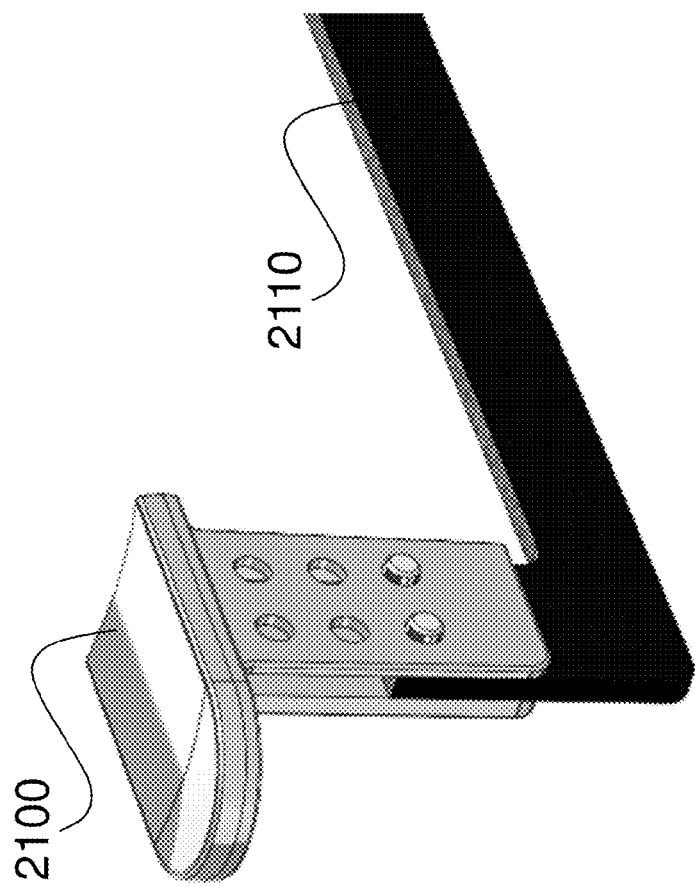
FIG. 24 is a perspective view of the sub-assembly of FIG. 21 from the opposite side of the key pad.

FIG. 10 illustrates a first exemplary embodiment of a single keystroke assembly 100 to be used in the inventive keyboard 10, e.g., a keyboard of a stenographic writer 1. The keystroke assembly 100 has a key lever 102 and a key pad 104 having a contact surface 106 at which a user imparts the force for activating the keystroke assembly 100. The key pad 104 is connected to a proximal end 103 of the key lever 102. The key lever 102 is connected movably to a key-retaining device 110 (see FIGS. 11 and 12) at a pivot point 120. The key lever 102 defines a pivot area 130 disposed between a distal portion 132 of the key lever 102 and the proximal end 103 of the key lever 102. The key lever 102 has a non-illustrated bias device (e.g., a spring) imparting a force upon the key lever 102 to keep the contact surface 106 raised, i.e., in a non-actuated position. To impart a raising force to the key lever 102, the spring is oriented so that the force imparted on the key lever 102 rotates the proximal end 103 counter-clockwise with respect to FIGS. 10 and 12 to 14 about the pivot point 120. The configuration of the bias device can take any form and the direction of force imparted by biasing spring can be in any direction so long as the contact surface 106 is raised when not activated and biases the key back to the raised position after being actuated. (The described configuration, of course, assumes that the keystroke assembly 100 is to be actuated by a lowering movement. Force in the opposite direction applies if the keystroke assembly 100 is to be lifted by a user.)

Height adjustability of each key pad 104 is accomplished in an exemplary embodiment shown in FIGS. 10, 11, 12, 13, and 15. Here, instead of having the key pad 104 fixed to the key lever 102 (e.g., integrally), a removable connection 108 is provided. This removable connection 108 can take any form. In the exemplary embodiment shown, the proximal end 103 of the key lever 102 forms a tab that is inserted into a groove of a hollow boss 105 projecting downward from the lower surface of the key pad 104. Fasteners 109 (here in the exemplary form of bolts) removably connect the key pad 104 to the key lever 102. It is noted that the height of the exemplary boss 105 in FIGS. 10, 11, 12, and 13 is slightly larger than the head of the fastener 109 and, therefore, provides a first "low" key pad height. In contrast thereto, the boss 145 shown projecting from the key pads 144 illustrated in FIGS. 14 and 16 to 20 is much longer and, therefore, provides a second "high" key pad height. These two exemplary embodiments of the key pads illustrate how easily a modular set of key pads can be created and used to customize each and every keystroke assembly 100 of the inventive stenographic keyboard. The exemplary embodiments of the key pad attachments shown are not the only possibilities for attaching the key pad 104, 144 to the key lever 102. Further, the key assemblies 100 are envisioned not only for use on the vowel keys 16, but for all keys, 20, 30, 40 on the stenographic keyboard 10.

Figure 26:
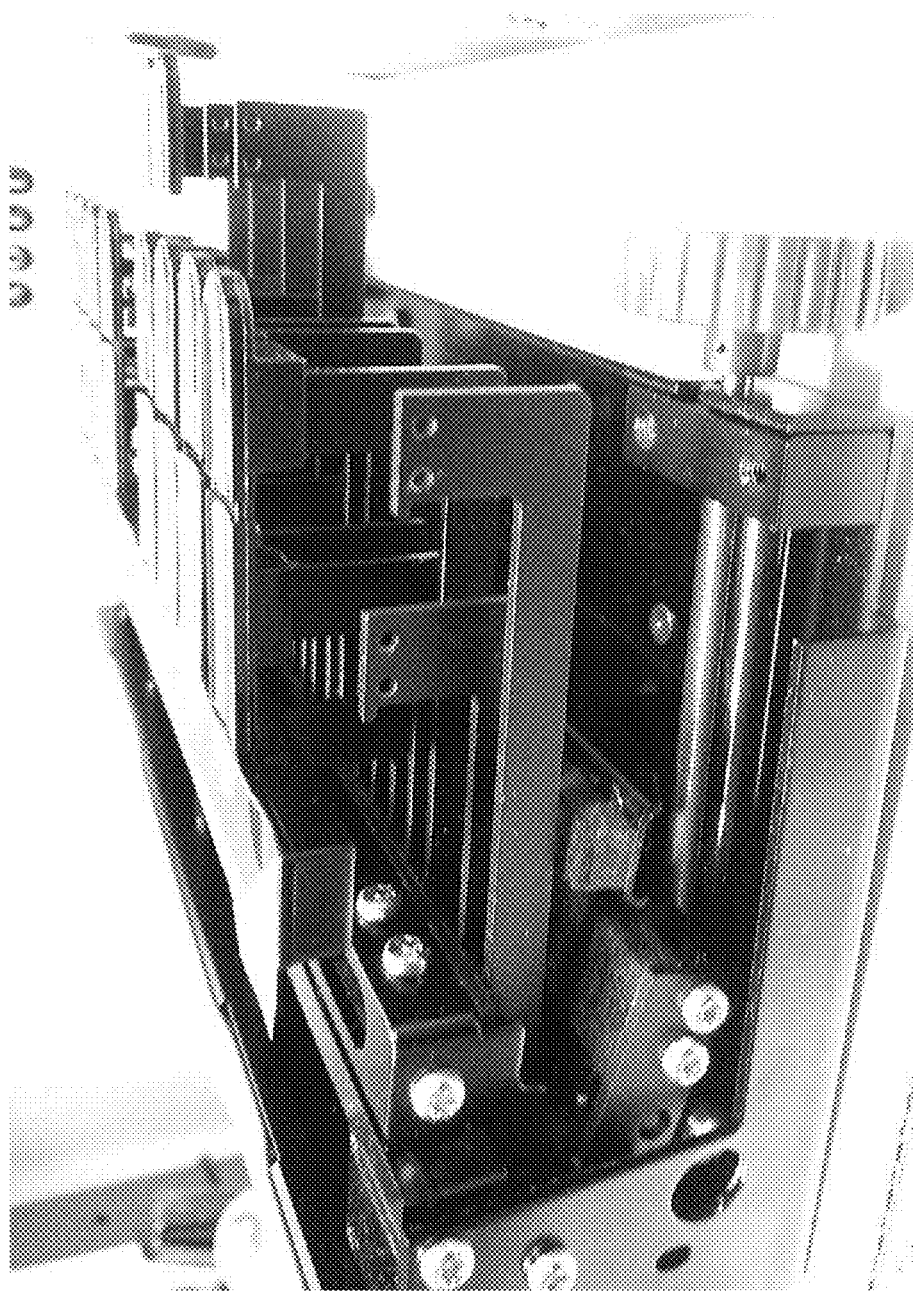
FIG. 26 is a photograph of a perspective view of the keyboard sub-assembly of FIG. 17 from above a front left with key caps for the front and rear control keys and two vowel key caps removed.
Figure 27:
FIG. 27 is a photograph of a perspective view of the keyboard sub-assembly of FIG. 17 from the left front side with key caps for the four vowel key caps removed.
Figure 28:
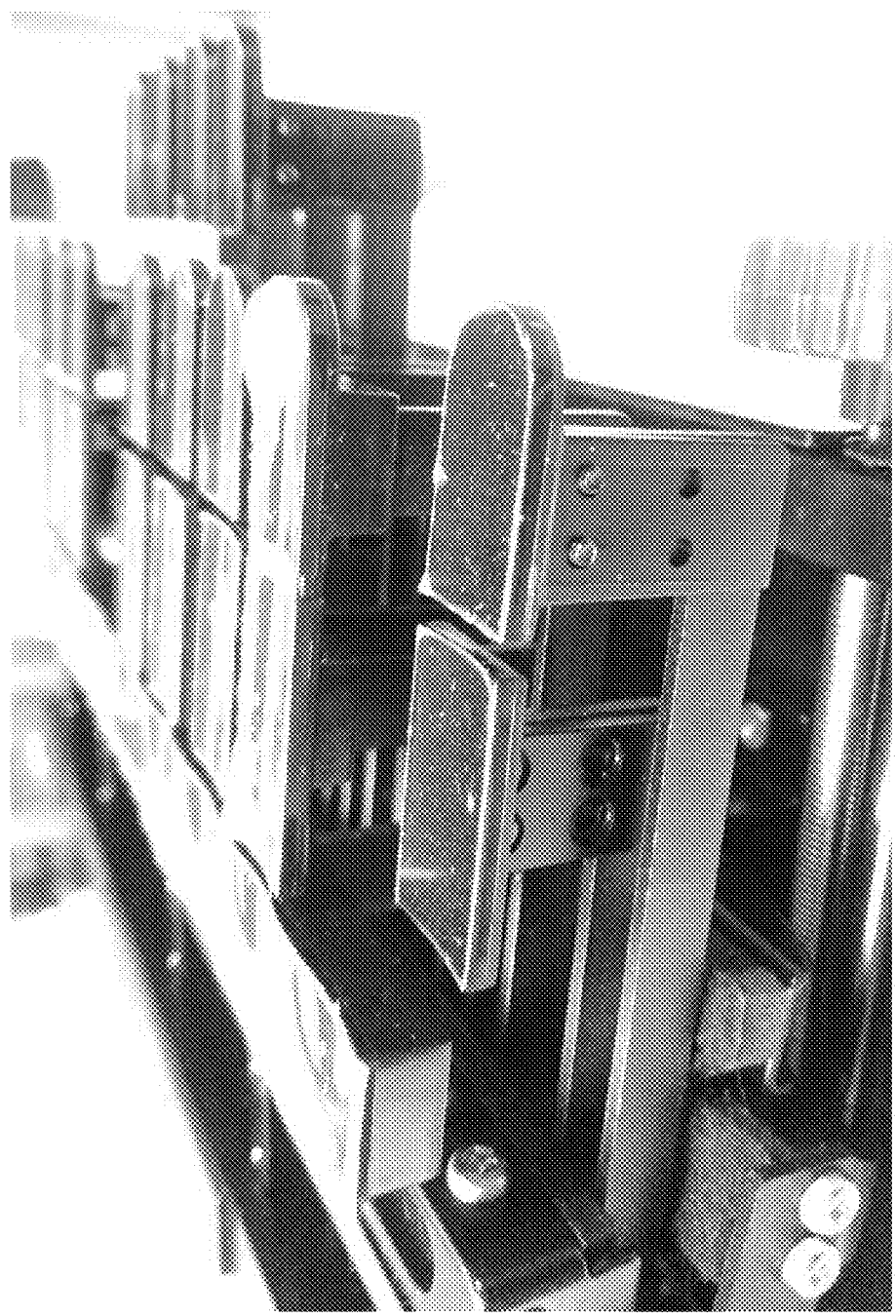
FIG. 28 is a photograph of a perspective view of the keyboard sub-assembly of FIG. 17 from the above a front left with the control keys and the vowel keys in a lowered orientation.
Figure 29:
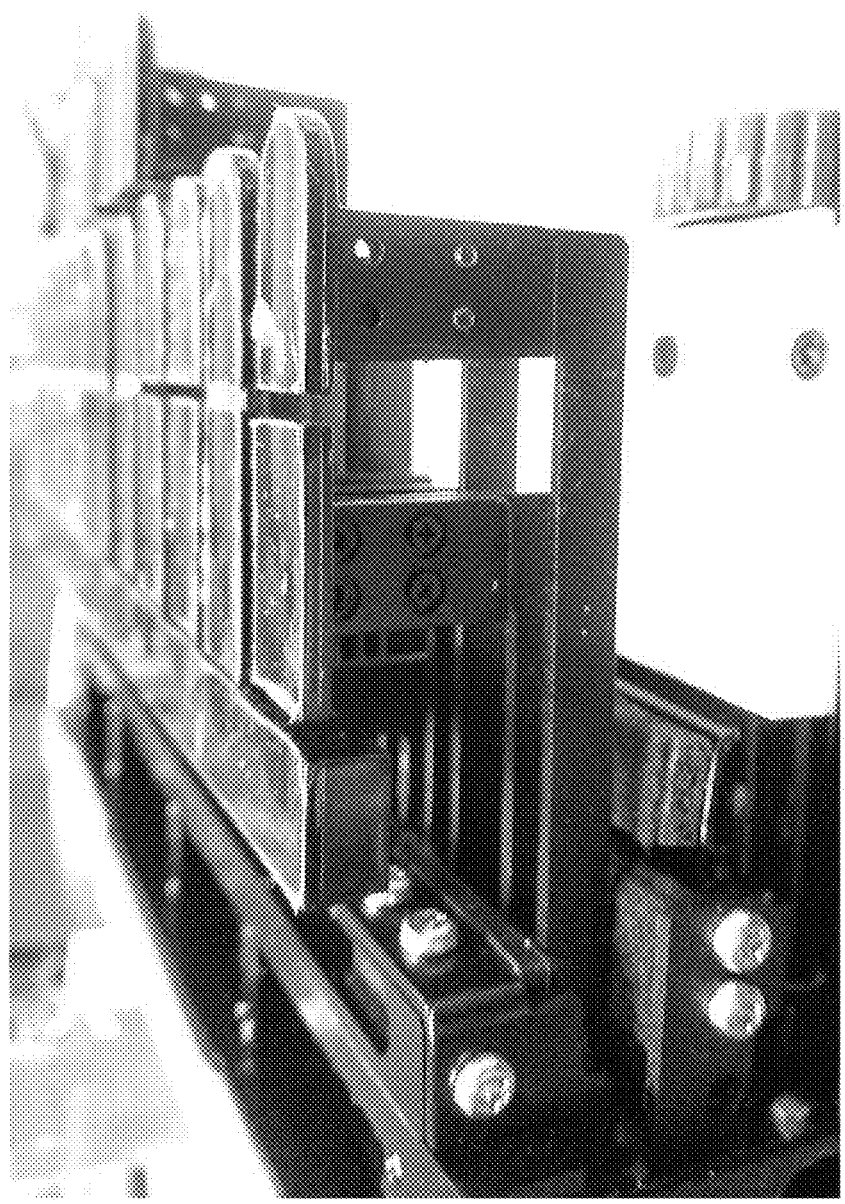
FIG. 29 is a photograph of a perspective view of the keyboard sub-assembly of FIG. 17 from the above a left side with the control keys and the vowel keys in a raised orientation.
Figure 34:
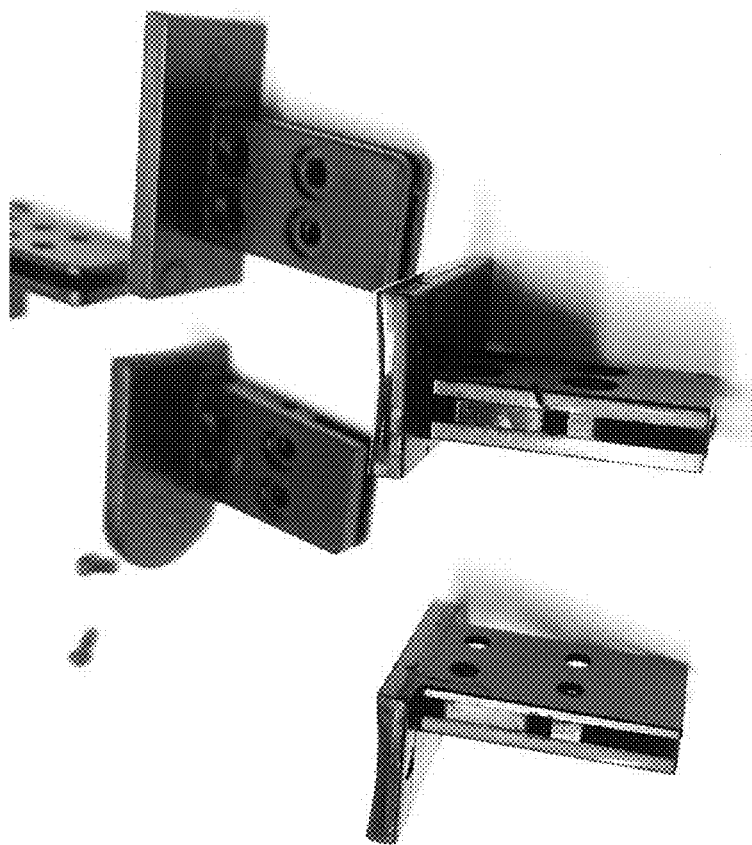
FIG. 34 is a photograph of a perspective view of key caps.

FIGS. 26 to 31 illustrate various configurations of the interchangeable key caps 104, 144, 2100 in the installed and removed states. FIG. 26 shows the key caps for the front and rear control keys 54, 52, respectively, removed as well as the "A" and "O" key caps removed. The "E" and "U" key caps are shown in the lowered orientation. FIG. 27 shows all of the vowel key caps removed. FIG. 28 shows all key caps installed in a lowered orientation and with the front and rear control keys 54, 52, respectively, in the lowered orientation. FIG. 29, in contrast, shows the front and rear control keys 54, 52, respectively, in a raised orientation even with the keys in the respective consonant rows 20, 30. Here, too, the vowel key caps are shown in the raised orientation. FIGS. 30 to 32 illustrate the difference in height of the lowered (FIG. 30), the intermediate (FIG. 31), and the raised (FIG. 32) orientations for the vowel key caps.

A standard fourth row bar 40 extends from the "S" key on the left to the "D" key on the right as shown in FIG. 9. It is noted, however, that some embodiments described herein include the additional control keys, such as those shown in FIGS. 12, 17 to 20, 26, 28, and 29. With the control keys, the standard fourth row bar 40 would not extend all the way to the control keys. The configuration shown in FIGS. 28 and 29, however, show the inventive fourth row bar 40 extending leftward so that it lies behind the third row control key just at it lies behind the other third row consonant keys. By extending the fourth row bar 40, the bar 40 can be pressed in conjunction with the control key that is immediately in front of it, using the same finger.

Figure 33:
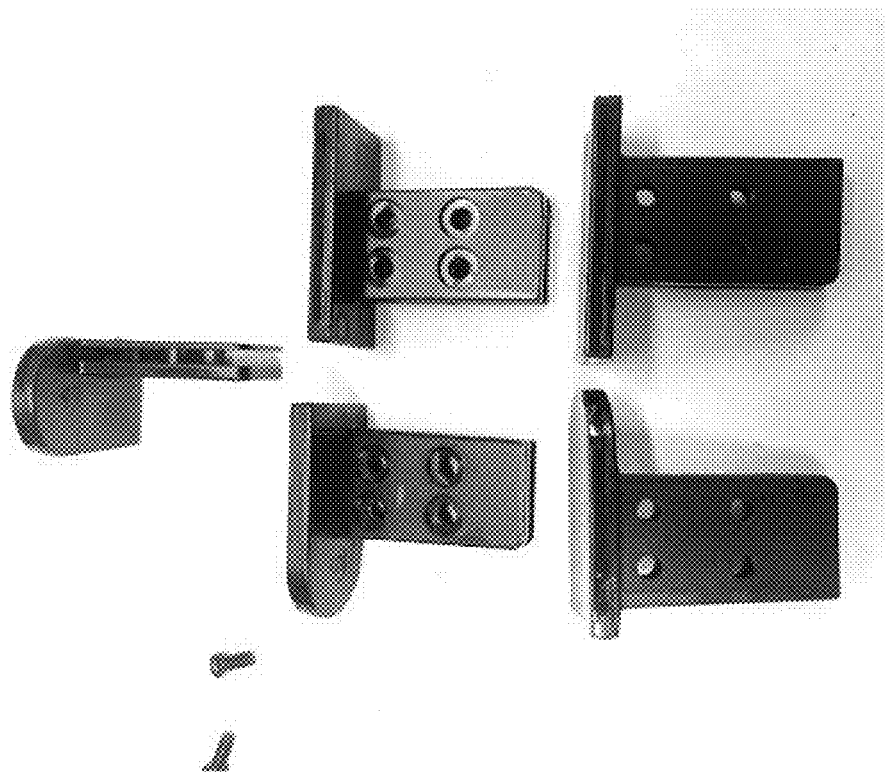
FIG. 33 is a photograph of a perspective view of key caps.

As can be seen from the key arms in FIGS. 26 and 27, they are parallel to one another yet the keys on the two rows 20, 30 are aligned with one another from front to back. This is accomplished by connecting the key caps to the key arms at respective right or left sides of the bottom surfaces. The mirror image connection bosses are illustrated best in FIGS. 32 and 33, showing key caps from each of the two consonant rows 20, 30 and the vowel row 16.

In the exemplary embodiments illustrated, the fasteners 109 pass through holes in the key levers 102, 142. If the holes were slots, then the fasteners 109 could be loosened so that the user could individually adjust the key pads 104, 144 to any desired height. Also, if the slots were circular segments having a centerpoint at the opposing connection (e.g., screw), then the key pads 104, 144 could be tilted, if desired by the stenographer, by loosening one screw and pivoting the key pad 104, 144 about the other screw. Also, a plurality of screw holes 107, either individual or pairs, can be added to those shown to permit different heights for the key pads 104, 144 as desired. One exemplary embodiment of the multiple screw holes 107 is depicted in FIGS. 21 to 25, where multiple rows of holes 1107 exist on the key cap 2100 and one row of holes 1107 exists on the key lever 2110. In an alternative non-illustrated configuration, the multiple rows of holes 1107 can exist on the key lever 2110 and one row of holes 1107 can exist on the key cap 2100. As a further alternative, multiple rows can exist on both. Two holes are not required in these embodiments, they are only examples. It is found, however, that multiple securing points provide greater stability than just a single securing point, but one is envisioned as well.

As an alternative to the key lever 102, 142 having a bend (e.g., an approximately 90-degree bend as shown in FIGS. 10 to 25), it is also possible to configure the key pad 104, 144 to have the bend itself and the tab would be at a distal end of a straight key lever 102, 142.

As discussed above, the writer 1 has extra keys, for example, the two control keys on the left-hand side of the keyboard 10. The inventive keys here are envisioned to apply the height adjustable embodiments to this keyboard 10 as well so the reporter can adjust each key as desired.

In addition to providing the key pads mentioned herein with adjustable heights, the key levers can be made adjustable to provide the user with adjustable key lever lengths. Also, to provide such longer key levers without having to replace the lever, the 90-degree bend can be part of the key pad 104, 144 with the holes 107 moved towards the distal portion 132 of the key lever 102 (as shown with the dashed line 111 in FIG. 10). Then, the adjustable and/or removable key pad/lever portions (not illustrated) could be easily changed by the user for custom key lever lengths. For example, one user might prefer a longer (closer to the reporter) vowel key in an embodiment where the vowel keys are raised to have an upper surface at the same level as the other keys. This occurs when the user does not want to stretch his/her thumbs far, which does not occur if the vowel keys are in the same plane. Reporters with large hands have indicated, for example, that they have to "scrunch up" their thumbs to keep them from going past the end of raised vowel keys, which happens when their thumbs are extended.

Another non-illustrated way to raise and lower the key caps is with a ratcheting or click-stop connection that allows the user to move the key cap up and down after raising or pressing in a tab that unlocks the ratchet.

Figure 35:
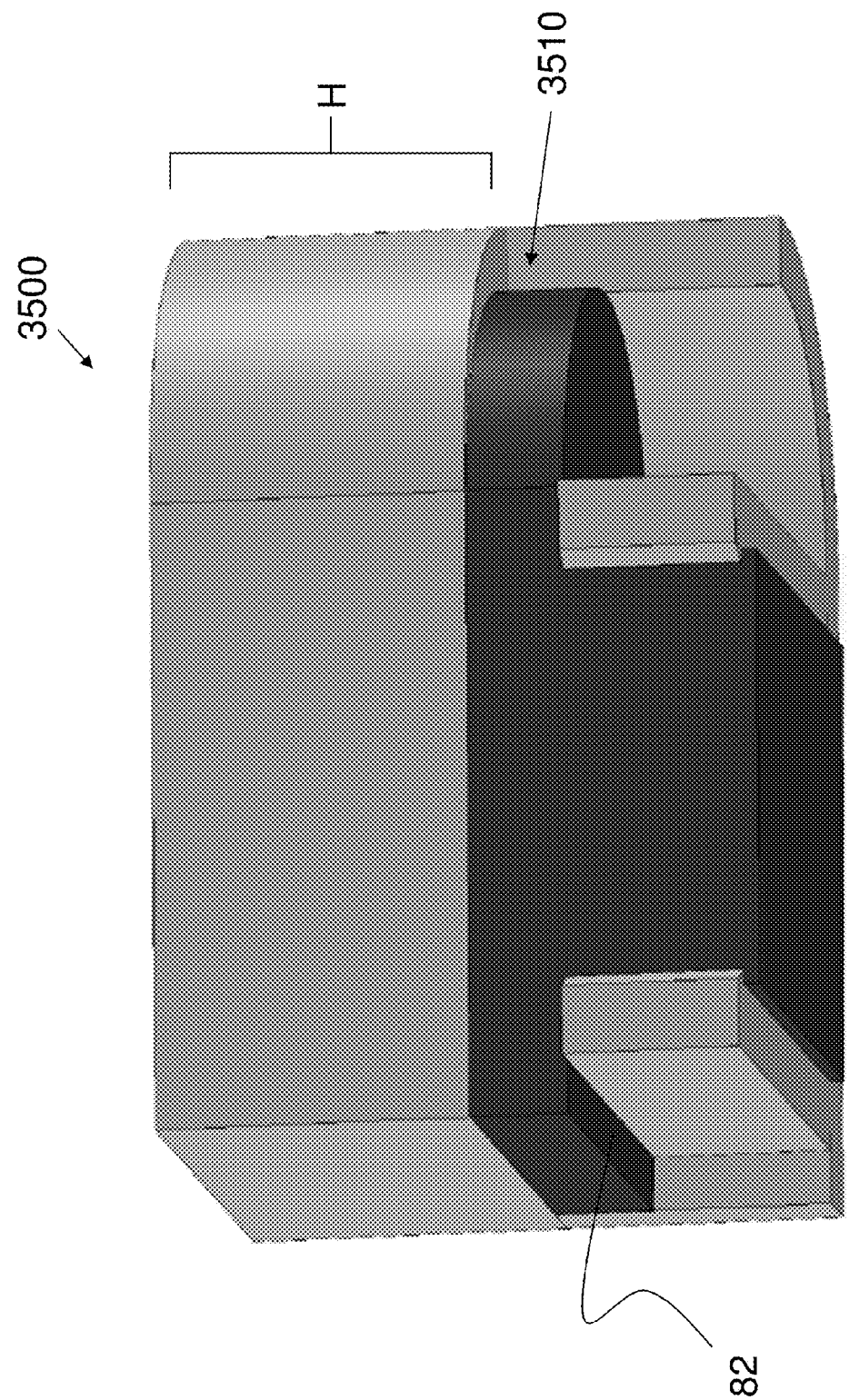
FIG. 35 is a perspective view of an alternative exemplary embodiment of a modular key pad system.

Yet another way to provide key caps that can be raised and lowered is with a modular system 3500 of keys caps 3510 shown, for example, in FIG. 35. Only the key pad (e.g., 82) of a standard key lever that connects to a stenographic machine is illustrated in FIG. 35. The modular keycap 3500 is actually a snap-on attachment to an end platform 3510 formed by the key pad 82. These snap-on keycaps 3500 can be made with varying heights H, only one of which is shown in FIG. 35. In this exemplary configuration, the keycap 3500 simply snaps onto the platform 3510 on top of a key arm. Because the spacing between the keys of a stenographic keyboard is small, the keycaps 3500 snap on from the side rather than snapping on from the front of the key. These keycaps 3500, for example, can be used easily on the four vowel keys 16 at the bottom of the keyboard and on the extra keys on the far left of the inventive keyboard. Because there is no adjacent key on one side of each of those keys, the keycap 3500 does not create any interference. These keycaps 3500 both snap on from the left and snap on from the right of a key platform 3510.

With this exemplary embodiment, the keycaps 3500 are also a little longer than the original keycaps. This can be a benefit for the vowel keys 16 on the front of the stenographic machine because, when these keys 16 are raised from their lower orientation, the reach to them with the thumbs of the user is shortened. It is, therefore, possible for reporters to "overshoot" standard-length vowel keys in the raised orientation, which does not occur if they are lengthened somewhat, for example, by the keycaps 3500.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The phrase "at least one of A and B" is used herein and/or in the following claims, where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A stenographic machine, comprising:
 a housing;
 a stenographic processing unit in the housing; and
 a stenographic keyboard at the housing and operatively connected to the stenographic processing unit to record stenographic dictation by a user, the stenographic keyboard having:
 a plurality of consonant key assemblies pivotally connected to the housing; and a plurality of vowel key assemblies pivotally connected to the housing, each of the vowel key assemblies having:
  a vowel key lever having a distal end; and
  a vertically adjustable vowel key cap having a securing device cooperating with the distal end to removably hold the key cap thereat in at least two different vertical positions.

2. The machine according to claim 1, wherein:
the vowel key cap has a top surface; and
the securing device of the vowel key cap adjusts with respect to the distal end to place the top surface of the vowel key cap at different vertical heights with respect to ground.

3. The machine according to claim 2, wherein the securing device of the vowel key cap comprises:
at least one first screw hole in the distal end;
at least one second screw hole in the vowel key cap; and
at least one fastener removably securing the at least one first screw hole in the distal end with the at least one second screw hole of the vowel key cap.

4. The machine according to claim 1, wherein the vowel key cap is a set of vowel key caps each having a different height to place the vowel key cap, when attached to the vowel key lever, at different positions selected from at least one of a different height and a different length.

5. The machine according to claim 3, wherein:
the at least one first screw hole in the distal end of the vowel key lever is a slot; and
the vowel key cap is tilted by pivoting about the at least one fastener.

6. The machine according to claim 3, wherein:
the at least one second screw hole in the vowel key cap is a slot; and
the vowel key cap is tilted by pivoting about the at least one fastener.

7. The machine according to claim 3, wherein the at least one first screw hole comprises at least one first screw hole pair and the at least one second screw hole comprises at least one second screw hole pair.

8. The machine according to claim 7, wherein at least one of the first and second screw hole pairs comprises a plurality of screw hole pairs situated in multiple rows.

9. The machine according to claim 1, wherein the vowel key lever comprises an approximately 90-degree bend.

10. The machine according to claim 1, wherein:
the vowel key lever is a straight vowel key lever having the distal end;
the vowel key cap comprises a bend; and
the vowel key cap is attached at the distal end of the straight vowel key lever.

11. The machine according to claim 1, wherein the vowel key caps on each of the vowel key assemblies adjusts to place all of the vowel key caps of the vowel key assemblies at the same height.

12. The machine according to claim 1, wherein the vowel key caps on each of the vowel key assemblies adjusts to place some of the vowel key caps of the vowel key assemblies at the same height.

13. A stenographic machine, comprising:
a housing;
a stenographic processing unit in the housing;
at least one fastener; and
a stenographic keyboard at the housing and operatively connected to the stenographic processing unit to record stenographic dictation by a user, the stenographic keyboard having:
  a plurality of consonant key assemblies pivotally connected to the housing; and
  a plurality of vowel key assemblies pivotally connected to the housing, each of the vowel key assemblies having:
    a vowel key lever having a distal end with at least one first screw hole; and
    a vertically adjustable vowel key cap having at least one second screw hole cooperating with the at least one fastener and the at least one first screw hole to removably hold the key cap thereat in at least two different vertical heights with respect to ground.

14. The machine according to claim 13, wherein the vowel key cap is a set of vowel key caps each having a different height to place the vowel key cap, when attached to the vowel key lever, at different positions selected from at least one of a different height and a different length.

15. The machine according to claim 13, wherein:
the at least one first screw hole in the distal end of the vowel key lever is a slot; and
the vowel key cap is tilted by pivoting about the at least one fastener.

16. The machine according to claim 13, wherein:
the at least one second screw hole in the vowel key cap is a slot; and
the vowel key cap is tilted by pivoting about the at least one fastener.

17. The machine according to claim 13, wherein the at least one first screw hole comprises at least one first screw hole pair and the at least one second screw hole comprises at least one second screw hole pair.

18. The machine according to claim 17, wherein at least one of the first and second screw hole pairs comprises a plurality of screw hole pairs situated in multiple rows.

19. The machine according to claim 13, wherein the vowel key caps on each of the vowel key assemblies adjusts to place all of the vowel key caps of the vowel key assemblies at the same height.

20. The machine according to claim 13, wherein the vowel key caps on each of the vowel key assemblies adjusts to place some of the vowel key caps of the vowel key assemblies at the same height.

* * * * *